(12) United States Patent
Yushin et al.

(10) Patent No.: US 12,266,782 B2
(45) Date of Patent: Apr. 1, 2025

(54) FLUORIDES IN NANOPOROUS, ELECTRICALLY-CONDUCTIVE SCAFFOLDING MATRIX FOR METAL AND METAL-ION BATTERIES

(71) Applicant: Sila Nanotechnologies, Inc., Alameda, CA (US)

(72) Inventors: Gleb Nikolayevich Yushin, Atlanta, GA (US); Bogdan Zdyrko, Atlanta, GA (US); Alexander Thomas Jacobs, Oakland, CA (US); Eugene Michael Berdichevsky, Alameda, CA (US)

(73) Assignee: SILA NANOTECHNOLOGIES, INC., Alameda, CA (US)

( * ) Notice: Subject to any disclaimer, the term of this patent is extended or adjusted under 35 U.S.C. 154(b) by 56 days.

(21) Appl. No.: 18/450,854

(22) Filed: Aug. 16, 2023

(65) Prior Publication Data
US 2024/0154094 A1    May 9, 2024

Related U.S. Application Data

(63) Continuation of application No. 17/823,337, filed on Aug. 30, 2022, now Pat. No. 11,735,716, which is a continuation of application No. 17/022,020, filed on Sep. 15, 2020, now Pat. No. 11,450,844, which is a continuation of application No. 16/292,241, filed on Mar. 4, 2019, now Pat. No. 10,784,504, which is a
(Continued)

(51) Int. Cl.
*H01M 4/136* (2010.01)
*H01M 4/04* (2006.01)
*H01M 4/1397* (2010.01)
*H01M 4/36* (2006.01)
*H01M 4/58* (2010.01)
*H01M 4/62* (2006.01)

(52) U.S. Cl.
CPC ......... *H01M 4/136* (2013.01); *H01M 4/0404* (2013.01); *H01M 4/0428* (2013.01); *H01M 4/0447* (2013.01); *H01M 4/1397* (2013.01); *H01M 4/366* (2013.01); *H01M 4/582* (2013.01); *H01M 4/625* (2013.01)

(58) Field of Classification Search
CPC .. H01M 4/136; H01M 4/0404; H01M 4/0428; H01M 4/0447; H01M 4/1397; H01M 4/366; H01M 4/582; H01M 4/625
See application file for complete search history.

(56) References Cited

U.S. PATENT DOCUMENTS

2007/0243466 A1* 10/2007 Amatucci ............. H01M 4/485
                                                    252/182.1
2013/0224594 A1*  8/2013 Yushin ................... H01M 4/38
                                                    252/182.1

* cited by examiner

*Primary Examiner* — Nathan T Leong
(74) *Attorney, Agent, or Firm* — MUNCY, GEISSLER, OLDS & LOWE, P.C.; Daniel Podhajny

(57) ABSTRACT

A battery electrode composition is provided that comprises composite particles. Each composite particle may comprise, for example, active fluoride material and a nanoporous, electrically-conductive scaffolding matrix within which the active fluoride material is disposed. The active fluoride material is provided to store and release ions during battery operation. The storing and releasing of the ions may cause a substantial change in volume of the active material. The scaffolding matrix structurally supports the active material, electrically interconnects the active material, and accommodates the changes in volume of the active material.

21 Claims, 25 Drawing Sheets

Related U.S. Application Data continuation of application No. 14/553,593, filed on Nov. 25, 2014, now Pat. No. 10,224,537.

(60) Provisional application No. 61/910,217, filed on Nov. 29, 2013.

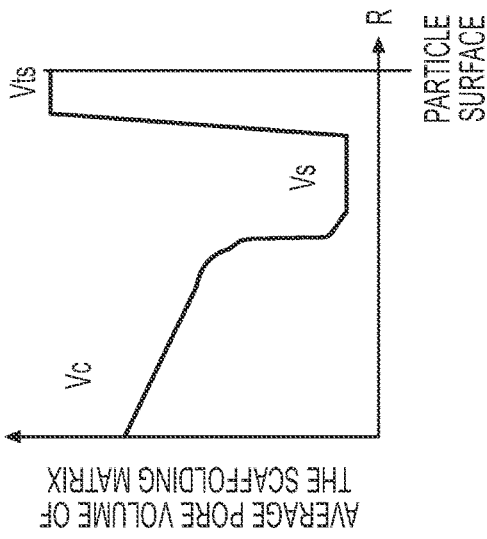
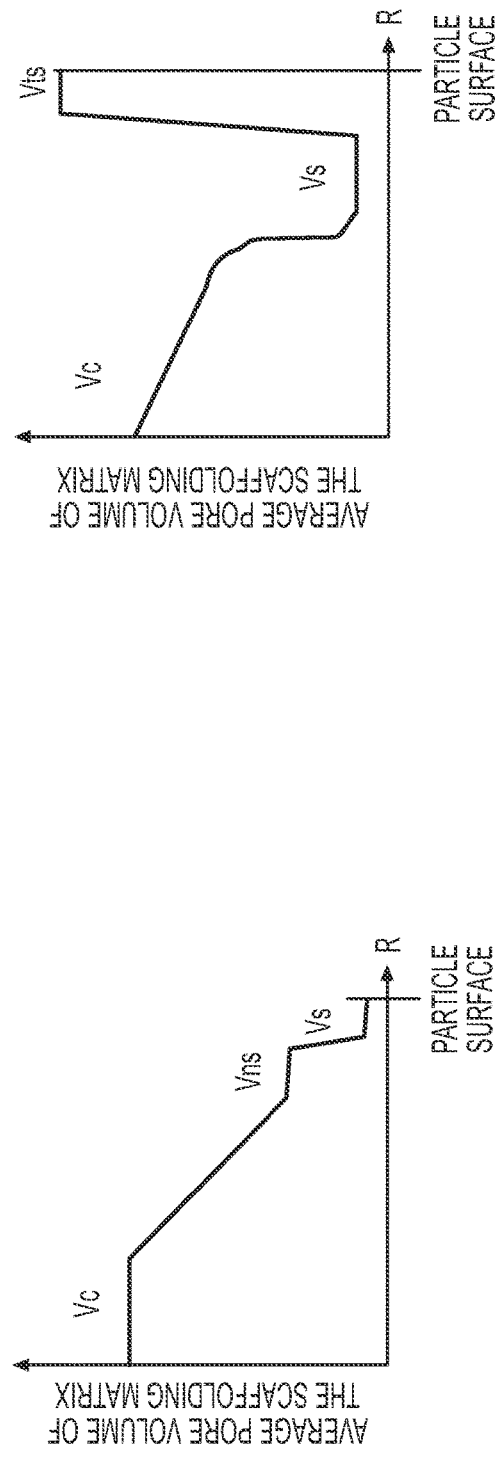
FIG. 4A
FIG. 4B
FIG. 4C
FIG. 4D

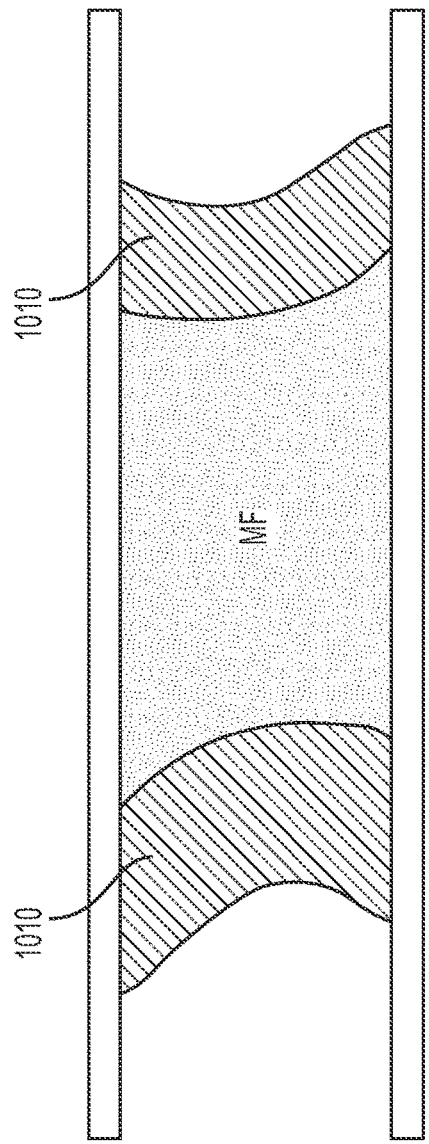
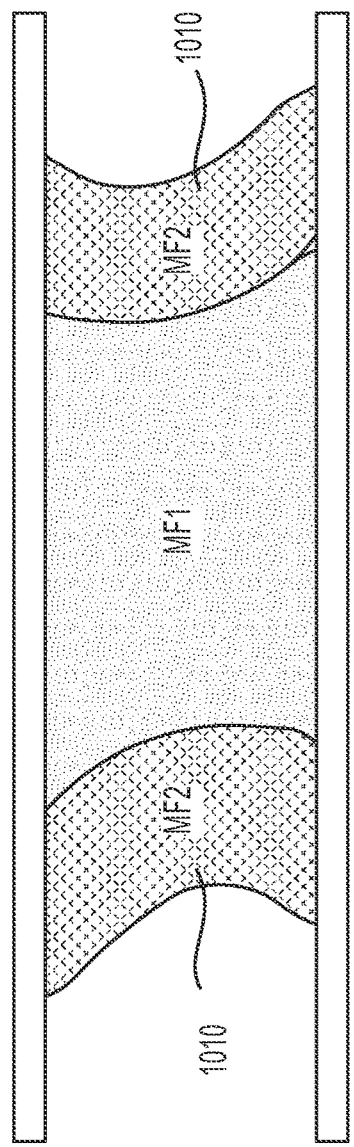
FIG. 10A
FIG. 10B

FLUORIDES IN NANOPOROUS, ELECTRICALLY-CONDUCTIVE SCAFFOLDING MATRIX FOR METAL AND METAL-ION BATTERIES

CROSS-REFERENCE TO RELATED APPLICATIONS

The present application for patent is a Continuation of U.S. patent application Ser. No. 17/823,337, entitled "FLUORIDES IN NANOPOROUS, ELECTRICALLY-CONDUCTIVE SCAFFOLDING MATRIX FOR METAL AND METAL-ION BATTERIES," filed Aug. 30, 2022, which is a Continuation of U.S. patent application Ser. No. 17/022,020, entitled "FLUORIDES IN NANOPOROUS, ELECTRICALLY-CONDUCTIVE SCAFFOLDING MATRIX FOR METAL AND METAL-ION BATTERIES," filed Sep. 15, 2020, which is a Continuation of U.S. patent application Ser. No. 16/292,241, entitled "FLUORIDES IN NANOPOROUS, ELECTRICALLY-CONDUCTIVE SCAFFOLDING MATRIX FOR METAL AND METAL-ION BATTERIES," filed Mar. 4, 2019, which is a Continuation of U.S. patent application Ser. No. 14/553,593, entitled "FLUORIDES IN NANOPOROUS, ELECTRICALLY-CONDUCTIVE SCAFFOLDING MATRIX FOR METAL AND METAL-ION BATTERIES," filed Nov. 25, 2014, which claims the benefit of U.S. Provisional Application No. 61/910,217, entitled "FLUORIDES CONFINED WITHIN SMALL NANOPORES OF CARBON PARTICLES FOR METAL ION AND METAL BATTERIES," filed Nov. 29, 2013, assigned to the assignee hereof, and each of which is expressly incorporated herein by reference in its entirety.

BACKGROUND

Field

The present disclosure relates generally to energy storage devices, and more particularly to metal and metal-ion battery technology and the like.

Background

Owing in part to their relatively high energy densities, light weight, and potential for long lifetimes, advanced metal-ion batteries such as lithium-ion (Li-ion) batteries are desirable for a wide range of consumer electronics. However, despite their increasing commercial prevalence, further development of these batteries is needed, particularly for potential applications in low- or zero-emission, hybrid-electrical or fully-electrical vehicles, consumer electronics, energy-efficient cargo ships and locomotives, aerospace applications, and power grids.

Conversion-type electrodes, such as fluorides, sulfides, oxides, nitrides, phosphides, hydrides and others for Li-ion batteries offer high gravimetric and volumetric capacities.

Fluorides, in particular, offer a combination of relatively high average voltage and high capacities, but suffer from several limitations for various metal-ion (such as Li-ion) battery chemistries. For example, only selected metal fluoride particles have been reported to offer some reasonable cycle stability in Li-ion battery cells (specifically $AgF_2$, $FeF_2$, $FeF_3$, $CoF_2$, and $NiF_2$). Many other metal fluorides are commonly believed not to be practical for applications in Li-ion batteries due to the irreversible changes that occur in such cathodes during battery operation. For example, during Li-ion insertion into some of the other fluorides (such as $CuF_2$, for example) and the subsequent formation of LiF during the conversion reaction, the original fluoride-forming element (such as Cu in the case of $CuF_2$) produces electrically isolated (Cu) nanoparticles. Being electrically isolated, such nanoparticles cannot electrochemically react with LiF to transform back into $CuF_2$ during subsequent Li extraction, thereby preventing reversibility of the conversion reaction. As a result, after a discharge, the cell cannot be charged back to the initial capacity.

However, even the cathodes based on those metal fluorides that are believed to be most practical due to their relatively reversible operation and reasonably low cost (such as $FeF_2$, $FeF_3$, $CoF_2$, and $NiF_2$), suffer from multiple limitations including: (i) low electrical conductivity, which limits their utilization and both energy and power characteristics in batteries; (ii) low ionic conductivity, which limits their utilization and both energy and power characteristics in batteries; and (iii) volume changes during metal ion insertion/extraction, which may cause mechanical and electrical degradation in the electrodes during battery operation. As a result, despite the theoretical advantages of fluoride-based cathodes, for example, their practical applications in metal-ion batteries are difficult to achieve. The cells produced with fluoride-based cathodes currently suffer from poor stability, volume changes, slow charging, and high impedance.

Several approaches have been developed to overcome some of the above-described difficulties, but none have been fully successful in overcoming all of them.

For example, decreasing particle size decreases the ion diffusion distance, and offers one approach to addressing the low ionic conductivity limitation. However, nanopowders suffer from high electrical resistance caused by the multiple, highly resistive point contacts formed between the individual particles. In addition, small particle size increases the specific surface area available for undesirable electrochemical side reactions. Furthermore, simply decreasing the particle size does not address and may in some cases exacerbate other limitations of such materials, such as volume changes as well as weakening of the particle-binder interfaces. Finally, in contrast to using micron-scale particles for cathode formulations, handling nanoparticles and using them to prepare dense electrodes is technologically difficult. Nanoparticles are difficult to disperse uniformly within conductive carbon additives and binder of the cathode and the undesirable formation of agglomerates of nanoparticles tends to take place. Formation of such agglomerates reduces the electrode density (thus reducing volume-normalized capacity and energy density of the cells), reduces electrode stability (since binder and conductive additives do not connect individual particles within such agglomerates) and reduces capacity utilization (since some of the nanoparticles become electrically insulated and thus do not participate in Li-ion storage).

In another approach, selected metal fluoride particles which offer some reasonable cycle stability in Li-ion battery cells (specifically $FeF_2$, $FeF_3$, $CoF_2$, and $NiF_2$) may be mechanically mixed with (in some cases by using high energy milling, as described, for example, in U.S. Pat. No. 7,625,671 B2) or deposited onto the surface of conductive substrates, such as carbon black, graphite, multi-walled carbon nanotubes, or carbon fibers. In this case, the high electrical conductivity of the carbon enhances electrical conductivity of the electrodes. However, the phase transformations during battery operation and the volume changes discussed above may induce the separation of the active material from the conductive additives, leading to resistance growth and battery degradation.

In yet another approach, selected metal fluoride particles (specifically FeF$_2$ particles) may be coated with a solid multi-walled graphitic carbon shell layer. In this case, the electrical conductivity of a metal fluoride cathode may be improved. However, the above-described volume changes during metal ion insertion may break the graphitic carbon coating and induce irreversible capacity losses. Similarly, the phase transformation during subsequent charging and discharging cycles may induce a separation of the active material from the graphitic carbon shell, leading to resistance growth and battery degradation.

Accordingly, there remains a need for improved metal and metal-ion batteries, components, and other related materials and manufacturing processes.

SUMMARY

Embodiments disclosed herein address the above stated needs by providing improved battery components, improved batteries made therefrom, and methods of making and using the same.

Battery electrode compositions are provided that comprise composite particles. Each composite particle may comprise, for example, active fluoride material and a nanoporous, electrically-conductive scaffolding matrix within which the active fluoride material is disposed. The active fluoride material is provided to store and release ions during battery operation. The storing and releasing of the ions may cause a substantial change in volume of the active material. The scaffolding matrix structurally supports the active material, electrically interconnects the active material, and accommodates the changes in volume of the active material.

The scaffolding matrix may comprise pores that have, for example, an average characteristic pore width in the range of about 1 nanometer to about 10 nanometers. In some designs, the active fluoride material may comprise a first metal fluoride and a second metal fluoride.

In some designs, each composite particle may further comprise a shell at least partially encasing the active fluoride material and the scaffolding matrix, the shell being substantially permeable to the ions stored and released by the active fluoride material. For example, the shell may comprise a protective layer formed from a material that is substantially impermeable to electrolyte solvent molecules. As another example, the shell may comprise an active material layer, wherein the active material layer is formed from a different active material than the active fluoride material disposed within the scaffolding matrix. The active material of the active material layer may have a substantially lower capacity relative to the active fluoride material. As another example, the shell may comprise a porous layer having a smaller average pore size than the scaffolding matrix. Pores in the porous layer of the shell may be infiltrated with the same active fluoride material as the active fluoride material disposed within the scaffolding matrix. As another example, the shell may be a composite material comprising an inner layer and an outer layer. The inner layer may be a porous layer, for example, having a smaller average pore size than the scaffolding matrix, and the outer layer may be, for example, (i) a protective layer formed from a material that is substantially impermeable to electrolyte solvent molecules or (ii) an active material layer formed from an active material that is different from the active material disposed within the scaffolding matrix. As another example, the shell may be a composite material comprising two or more materials arranged in an interpenetrating configuration such that each of the materials of the composite material contacts the scaffolding matrix.

In some designs, each composite particle may further comprise external channel pores extending from an outer surface of the scaffolding matrix towards the center of the scaffolding matrix, providing channels for diffusion of the ions into the active material disposed within the scaffolding matrix. At least some of the external channel pores may be filled with (i) a porous material having a different microstructure than the scaffolding matrix, (ii) an active material that is different from the active fluoride material disposed within the scaffolding matrix, and/or (iii) a solid electrolyte material.

In some designs, each composite particle may further comprise a protective material at least partially penetrating the scaffolding matrix with a radial-varying composition along a radius of the particle, the protective material being substantially permeable to the ions stored and released by the active fluoride material.

Methods of fabricating a battery electrode composition comprising composite particles are also provided. An example method may comprise, for example, providing an active fluoride material to store and release ions during battery operation, and forming a nanoporous, electrically-conductive scaffolding matrix within which the active fluoride material is disposed. The storing and releasing of the ions may cause a substantial change in volume of the active material. The scaffolding matrix may structurally support the active material, electrically interconnect the active material, and accommodate the changes in volume of the active material.

In some designs, forming the scaffolding matrix may comprise, for example, forming a carbon-containing precursor, oxidizing and carbonizing the carbon-containing precursor to form a carbonized particle, and activating the carbonized particle at elevated temperature to form the scaffolding matrix with a pore volume of greater than 50 vol. %. In some designs, the active fluoride material-infused scaffolding matrix may be formed, for example, as a powder comprising particles, with the method further comprising mixing the active fluoride material-infused scaffolding matrix particles with a binder, and casting the binder-bonded particles onto a metal foil current collector. In some designs, the method may further comprise forming a shell at least partially encasing the active fluoride material and the scaffolding matrix, the shell being substantially permeable to the ions stored and released by the active material. In some designs, at least a portion of the shell material may be deposited by chemical vapor deposition. In some designs, at least an outer portion of the shell may be deposited electrochemically during one or more initial battery cycles, during which electrochemical decomposition of at least some electrolyte components occurs.

BRIEF DESCRIPTION OF THE DRAWINGS

The accompanying drawings are presented to aid in the description of embodiments of the invention and are provided solely for illustration of the embodiments and not limitation thereof.

FIGS. 4A-4D illustrate four particular examples of the relative changes in average pore volume of a scaffolding matrix as a function of the distance from the center of the particle towards the surface of the particle.

FIGS. 10A-10B illustrate two particular examples of an individual fluoride nanoparticle confined within a pore of a conductive scaffolding matrix and further coated either with another metal fluoride (which may provide advantageous stability within the potential range of operation or improved rate performance) or a protective layer of another material, such as an intercalation-type active material, a solid electrolyte, or a mixed conductor.

DETAILED DESCRIPTION

Aspects of the present invention are disclosed in the following description and related drawings directed to specific embodiments of the invention. The term "embodiments of the invention" does not require that all embodiments of the invention include the discussed feature, advantage, process, or mode of operation, and alternate embodiments may be devised without departing from the scope of the invention. Additionally, well-known elements of the invention may not be described in detail or may be omitted so as not to obscure other, more relevant details.

While the description below may describe certain examples in the context of Li and Li-ion batteries (for brevity and convenience, and because of the current popularity of Li technology), it will be appreciated that various aspects may be applicable to other rechargeable and primary, metal and metal-ion batteries (such as Na-ion, Mg-ion, and others). Further, while the description below may also describe certain examples of the material formulations in a Li-free (e.g., charged) state, it will be appreciated that various aspects may be applicable to Li-containing electrodes (e.g., in either a partially or fully discharged state).

Figure 1:
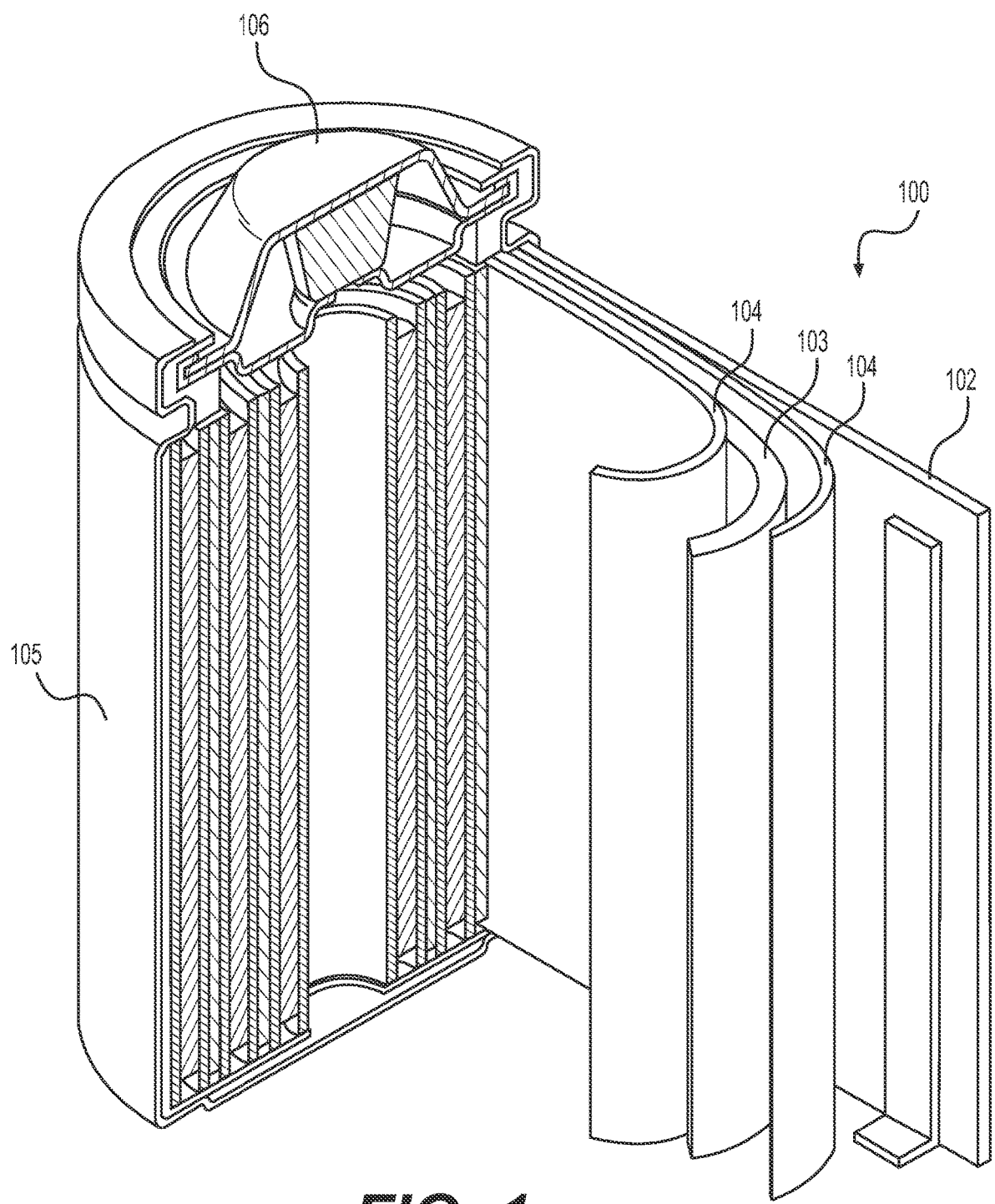
FIG. 1 illustrates an example battery (e.g., Li-ion) in which the components, materials, methods, and other techniques described herein, or combinations thereof, may be applied according to various embodiments.

FIG. 1 illustrates an example metal-ion (e.g., Li-ion) battery in which the components, materials, methods, and other techniques described herein, or combinations thereof, may be applied according to various embodiments. A cylindrical battery is shown here for illustration purposes, but other types of arrangements, including prismatic or pouch (laminate-type) batteries, may also be used as desired. The example battery 100 includes a negative anode 102, a positive cathode 103, a separator 104 interposed between the anode 102 and the cathode 103, an electrolyte (not shown)

impregnating the separator 104, a battery case 105, and a sealing member 106 sealing the battery case 105.

Both conventional liquid and solid electrolytes may be used for the designs herein. Conventional electrolytes for Li- or Na-based batteries of this type are generally composed of a single Li or Na salt (such as $LiPF_6$ for Li-ion batteries and $NaPF_6$ or $NaClO_4$ salts for Na-ion batteries) in a mixture of solvents (such as a mixture of carbonates). The most common salt used in a Li-ion battery electrolyte, for example, is $LiPF_6$, while less common salts include lithium tetrafluoroborate ($LiBF_4$), lithium perchlorate ($LiClO_4$), lithium bis(oxalato)borate ($LiB(C_2O_4)_2$, lithium difluoro(oxalate)borate ($LiBF_2(C_2O_4)$), lithium imides (such as $SO_2FN^-(Li^+)SO_2F$, $CF_3SO_2N^-(Li^+)SO_2CF_3$, $CF_3CF_2SO_2N^-(Li^+)SO_2CF_3$, $CF_3CF_2SO_2N^-(Li^+)SO_2CF_2CF_3$, $CF_3SO_2N^-(Li^+)SO_2CF_2OCF_3$, $CF_3OCF_2SO_2N^-(Li^+)SO_2CF_2OCF_3$, $C_6F_5SO_2N^-(Li^+)SO_2CF_3$, $C_6F_5SO_2N^-(Li^+)SO_2C_6F_5$ or $CF_3SO_2N^-(Li^+)SO_2PhCF_3$, and others) and others. Electrolytes for Mg-ion, Ca-ion, and Al-ion batteries are often more exotic as these batteries are in earlier stages of development. They may comprise different salts and solvents (in some cases, ionic liquids may replace organic solvents for certain applications).

In addition, solid electrolytes may provide some advantages for fluoride-based cathodes, such as stability against oxidation at high cathode potentials, reduced undesirable side reactions between the cathode and electrolyte, as well as enhanced safety. Examples of the solid ceramic electrolytes include sulfide-based electrolytes (such as $Li_2S-P_2S_5$, $Li_2S-Ga_2S_3-GeS_2$, $Li_2S-SiS_2$, etc.), oxide-based electrolytes (such as Li—La—Ti—O garnet, Li—La—Ta—O garnet, Li—Si—O glass, Li—Ge—O glass, $Li_9SiAlO_8$, etc.), mixed sulfide-oxide electrolytes (such as $Li_2S-SiS_2-Li_4SiO_4$, $LiI-La_2O_2S-La_2O_2S_2$, etc.), and many others. The use of solid electrolytes with conversion-based cathodes has been hindered by the inability of ceramics to accommodate the volume changes that take place during charge and discharge cycling. Their use with fluoride-based cathodes has been particularly difficult because fluoride-based active cathode particles exhibit large volume changes.

Conventional cathode materials utilized in metal-ion batteries are of an intercalation-type. Metal ions are intercalated into and occupy the interstitial positions of such materials during the discharge of a battery. However, such cathodes exhibit small gravimetric and more importantly small volumetric capacities: typically less than 220 mAh/g active material and less than 600 mAh/cm³ at the electrode level, respectively. This low capacity of intercalation-type cathodes limits the energy density and specific energy of metal-ion batteries.

Fluoride-based cathodes may offer outstanding technological potential due to their very high capacities, in some cases exceeding 300 mAh/g (greater than 1200 mAh/cm³ at the electrode level). For example, $FeF_3$ offers a theoretical specific capacity of 712 mAh/g; $FeF_2$ offers a theoretical specific capacity of 571 mAh/g; $MnF_3$ offers a theoretical specific capacity of 719 mAh/g; $CuF_2$ offers a theoretical specific capacity of 528 mAh/g; $NiF_2$ offers a theoretical specific capacity of 554 mAh/g; $PbF_2$ offers a theoretical specific capacity of 219 mAh/g; $BiF_3$ offers a theoretical specific capacity of 302 mAh/g; $BiF_5$ offers a theoretical specific capacity of 441 mAh/g; $SnF_2$ offers a theoretical specific capacity of 342 mAh/g; $SnF_4$ offers a theoretical specific capacity of 551 mAh/g; $SbF_3$ offers a theoretical specific capacity of 450 mAh/g; $SbF_5$ offers a theoretical specific capacity of 618 mAh/g; $CdF_2$ offers a theoretical specific capacity of 356 mAh/g; and $ZnF_2$ offers a theoretical specific capacity of 519 mAh/g.

In addition, in cases where the fluoride-forming element is inexpensive, fluoride-based cathodes offer low cost potential as well. The 5-year averaged wholesale commodity cost of many fluoride-forming elements is reasonably low. For example, in 2013, the cost of Fe was only around \$0.2/kg; the cost of Cu was only around \$4-9/kg, the cost of Zn was only around \$1-2/kg; the cost of Cd was only around \$1/kg; the cost of Pb was only around \$1-2/kg; and the cost of Sb was only around \$6-15/kg.

However, many fluorides with high theoretical capacity and high theoretical energy density (such as $CuF_2$, $NiF_2$, $PbF_2$, $BiF_3$, $BiF_5$, $SnF_2$, $SnF_4$, $SbF_3$, $CdF_2$, $ZnF_2$, and others) have been believed not to be practical for use in rechargeable Li-ion batteries due to the previously observed lack of stability and large polarization experimentally observed when they were used in conventional cathode configurations, where metal fluorides were mechanically mixed with carbon additives or deposited on the outer surface of carbon particles.

The advantage of some of these so-called "impractical" fluorides (such as $CuF_2$, $PbF_2$, $SnF_2$, $CdF_2$, $ZnF_2$, and others) over more commonly used $FeF_3$ is a more flat discharge curve, which allows the Li-ion battery cell based on such cathodes to maintain a more constant voltage, while utilizing a large portion of their theoretical capacities.

Figure 2:
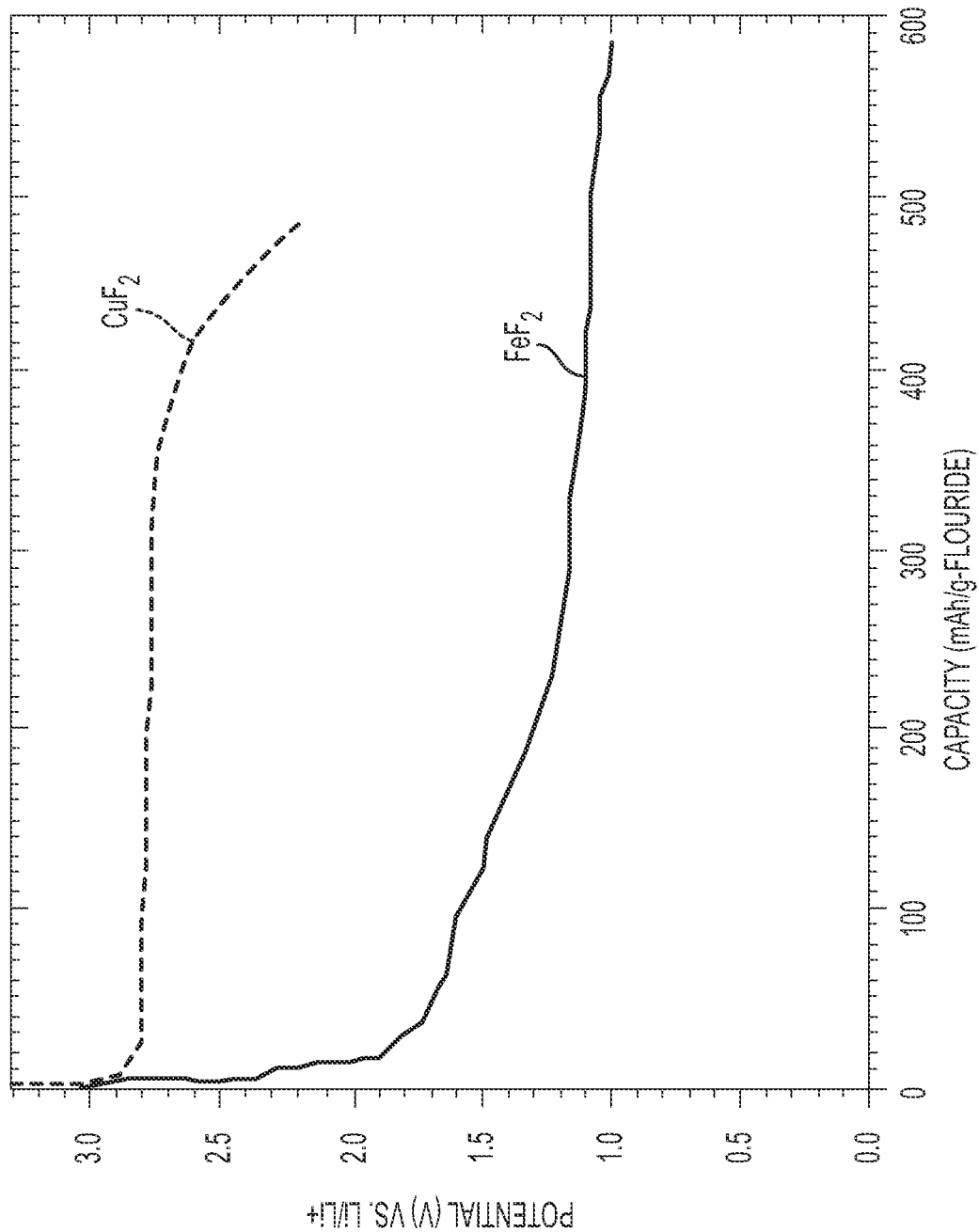
FIG. 2 illustrates a comparison of a voltage profile of Li insertion into an iron fluoride vs. Li insertion into a copper fluoride.

FIG. 2 compares the discharge curves of $CuF_2$ with that of example $FeF_2$ and $FeF_3$-based cathodes, demonstrating significantly flatter performance of $CuF_2$.

In contrast to the small structural, chemical, and volumetric differences observed during insertion/extraction of Li ions into/out of cathode intercalation compounds, fluorides exhibit dramatic structural changes and significant volume changes accompanying the cell cycling. During Li insertion, a displacement/conversion process takes place, where Li displaces solid fluoride-forming element(s) (such as metals or semimetals, or in some cases semiconductors), leading to the formation of solid LiF and clusters of the fluoride-forming element(s), typically only 2-10 nm in size. The size of these clusters may be related to the mobility of metals in the intermediate reaction products. In cases where the diffusion distances between these thermodynamically stable structures is small and when electrons can be supplied to support electrochemical reactions, reversible Li insertion and extraction may become feasible.

Theoretically, the Li capacity of fluorides is determined by its stoichiometry and the density of the fluoride-forming metal according to the following reaction (which assumes fully reversible transformation):

$$xLi^+ + xe^- + MF_x \Leftrightarrow xLiF + M \quad (Eq.\ 1)$$

where M is a fluoride-forming element.

Mechanistically, it has been identified that initial insertion of Li into some of the metal fluorides (such as $FeF_2$ and $FeF_3$) takes place as intercalation. For example, during electrochemical reaction of Li with $FeF_3$, Li first intercalates into the structure forming:

$$Li^+ + e^- + FeF_3 \Leftrightarrow LiFeF_3 \quad (Eq.\ 2)$$

Only after additional Li insertion, a conversion reaction transforms the reaction products to LiF and interconnected Fe nanoparticles according to:

$$2Li^+ + 2e^- + LiFeF_3 \Leftrightarrow 3LiF + Fe \quad (Eq.\ 3)$$

As discussed in the background above, conventional fluoride cathodes may suffer from limitations, such as (i) low electrical conductivity, (ii) low ionic conductivity, and (iii) volume changes during metal ion insertion/extraction. Other limitations include (iv) gas generation during fluoride reactions with electrolytes (particularly at high potentials), which may cause battery degradation, (v) formation of surface species during surface reactions with electrolyte, which may increase resistance and reduce reversibility of electrochemical reactions, (vi) dissolution of the metal fluorides during cycling, which may increase resistance, damage the solid electrolyte interphase (SEI) layer on the anode, and reduce both the power performance and cycle stability of battery cells, and (vii) irreversible changes within their structure during battery operation, which may also lead to irreversible capacity losses.

The present disclosure provides for advanced composite materials for battery electrodes formed from a nanoporous (preferably with pores in the range of about 0.5 nm to about 10 nm, but in some designs with pores as large as 500 nm or higher), generally electrically-conductive matrix having active fluoride material(s) disposed therein. As discussed in more detail below, several advantages over conventional designs are provided by confining active fluoride material into this type of "scaffolding" matrix. For example, confining the active fluoride material inside such a matrix (as opposed to surface deposition) helps avoid the often undesirable agglomeration of individual active material particles. As described in more detail below, this matrix may additionally help to stabilize particle size, such that active material expansion may be accommodated by pores present in a metal fluoride-filled conductive matrix composite. Conductivity properties of the matrix may allow reduced resistance and increased rate performance. Scaffolding properties of the matrix may further allow formation of protective shells around the composite particles that are mechanically and electrochemically stable during cycling and the resulting volume changes within a metal-fluoride (MF) active material.

Figure 3A:
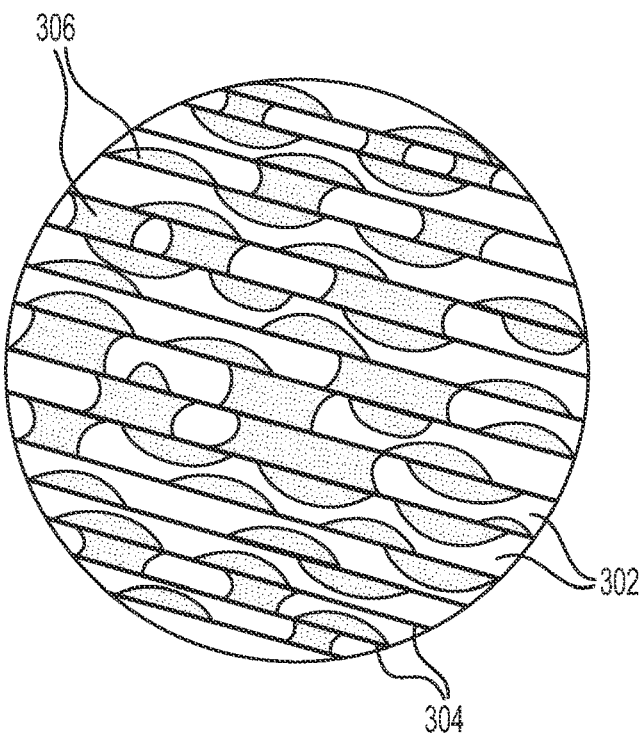
FIGS. 3A-3B illustrate two particular examples of active fluoride nanoparticles or active fluoride nanoplatelets infiltrated into a conductive scaffolding matrix of a nanoporous material with (A) straight and (B) curved pores. The orientation of the pores is not indicated in this schematic.
Figure 3B:
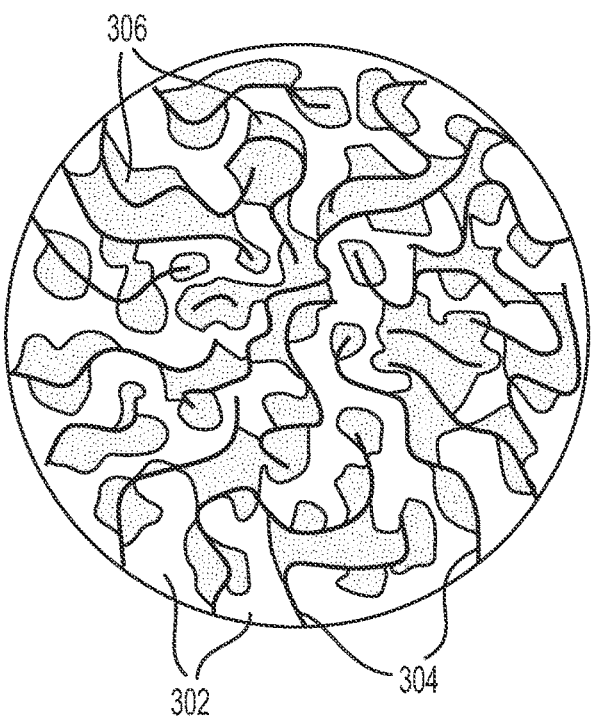

FIGS. 3A-3B illustrate two example battery electrode compositions comprising a fluoride infiltrated into a conductive, nanoporous scaffolding matrix according to certain example embodiments. In each of the illustrated example designs, a composite particle is shown with pores 302, conductive pore walls 304, and fluoride 306 infiltrated within the pores 302.

The "active" fluoride stores and releases metal ions (e.g., Li ions in a Li battery or a Li-ion battery) during battery operation according to the reaction described above (Eq. 1). As discussed above, storing and releasing of these metal ions causes a substantial change in volume of the active material, which, in conventional designs, may lead to the loss of electrical contact within the electrode and thus result in a rapid loss of capacity during battery operation. In addition, in some cases clusters of the fluoride forming element (e.g., clusters of Cu in the case of $CuF_2$) may form isolated particles not electrically connected to each other. Similarly, the highly electrically insulating LiF may become electrically disconnected from the current collector. In this case, the conventional design of electrode or electrode particles does not allow one to reversibly store and release Li ions during battery operation because such processes require uninterruptible transport of electrons into (or out of) the active material. Moreover, in some cases (e.g., in the case of $CuF_2$), the rapid diffusion of a fluoride-forming element combined, for example, with a high interfacial energy between LiF and the fluoride-forming element leads to a physical separation of the LiF and fluoride-forming element during Li insertion. In conventional designs, this greatly limits both the rate and reversibility of the re-formation of an initial fluoride during Li extraction due to mass transport limitations originating from the separation discussed above.

In the designs shown here in FIGS. 3A-3B, however, the volume changes accompanying the conversion reactions (such as given by Eq. 1) can be accommodated by the pores of the nanoporous scaffolding matrix. In order to maximize the volumetric capacity of the composite material, it may be beneficial to optimize the pore volume of the fluoride-filled scaffolding matrix in such a way as to have only a small volume of pores (preferably less than about 15%) left unoccupied by LiF and a fluoride forming material after Li insertion to a full discharge. The designs shown here additionally greatly enhance the rate and reversibility of battery operation. When the pore size of the scaffolding matrix becomes small, electrons not only can transport through the matrix material but also tunnel from the pore walls to the electrochemical reaction sites during Li insertion and back during Li extraction. In order to achieve a reasonably high reaction rate, it may be advantageous to limit a tunneling distance to about 3-5 nm or less. Therefore, the pores of the nanoporous scaffolding matrix may preferably be smaller than 10 nm in width.

For designs in which the pores comprise conductive nanoparticles (either initially added or formed during conversion reactions, or, more generally, during battery operation), pores in the range of about 10 nm to about 500 nm may be suitable as well. However, in some cases, such larger pores may lead to reduced power performance characteristics. Too small of pores (e.g., pores less than about 0.5 nm), on the other hand, may make it more challenging to uniformly infiltrate fluorides into their pore structure.

Finally, this design confines both the initial fluoride as well as clusters of LiF and fluoride-forming element(s) within the small nanopores. In this case, the scaffolding matrix forces better contact between the clusters of LiF and fluoride-forming element(s), greatly improving the rate of charging. Furthermore, if the scaffolding matrix possesses some elasticity and reasonably high elastic modulus (e.g., Young's modulus greater than about 5 MPa), then the matrix material elastically deformed during Li insertion will assist in Li extraction by lowering the reaction energy barrier by its strain energy released by such extraction. This additionally enhances the charge rate of a battery.

As one example, porous carbon (e.g., having over 90% $sp^2$-bonded atoms) can serve as an electrically conductive scaffolding matrix. Since the capacity of carbon in the cathode voltage range of interest (above 1.5 V vs. Li/Li+ in the case of a Li battery or a Li-ion battery) is small, it may be preferable to minimize its absolute mass and the volume occupied by its pore walls, while maintaining the desired pore size and electrical conductivity. Porous carbons having most of the pore walls being a monolayer-thick have been found to work particularly well, providing both high pore volume and sufficiently high conductivity, while minimizing the volume, which "inactive" carbon atoms occupy. A "perfect" porous carbon particle having slit shaped pores and pore walls composed of single-layer graphene may exhibit a specific surface area of around 2630 $m^2/g$. Porous carbons with experimentally measured Brunauer, Emmett and Teller (BET) specific surface area above 500 $m^2/g$ (more preferably above 1000 $m^2/g$) have been found to work well as a conductive matrix for fluoride infiltration. An example of a high surface area porous carbon is activated carbon. It may be produced by pyrolysis of carbon-containing organic precursors, followed by its either chemical or physical activation (partial oxidation of the resulting carbon with the purpose to enhance its pore volume and specific surface area). It may be further preferred for porous carbon to have pores occupying at least 50% of the total volume (preferably over 70% and less than around 95% of the volume). Smaller pore volume provides less space for fluoride infiltration, and may thus reduce volumetric capacity of the fluoride-infiltrated particles. Conversely, a pore volume above 95% provides reduced mechanical properties to the particles (which may translate into poor electrode stability) and additionally makes them more difficult to handle due to very low density. Conventionally produced activated carbon particles often exhibit a majority of pores in the range of 0.3 nm to 10 nm. Those that have a majority of pores (preferably more than 80% by volume) in the range of about 0.5 nm to about 10 nm have been found to be particularly useful as a conductive scaffolding matrix for fluoride infiltration.

In some examples, the carbon scaffolding matrix may be doped or functionalized with other species (e.g., nitrogen) to increase Li ion transport or to increase its wetting properties.

As is further illustrated in FIGS. 3A-3B, the pores may be straight, as shown in FIG. 3A, or curved, as shown in FIG. 3B. Activated carbons typically exhibit irregularly-shaped curved pores. The orientation of the pores may vary depending on the sample preparation. It may also vary within a single particle. For example, in the center of the particle, the pores may be oriented randomly or along its radius, while closer to the surface the pores may be oriented parallel to the surface of the particle. In this case, advantageous mechanical properties may be achieved. Further, in some cases, the formation of protective coatings, which serve to stabilize metal fluorides against irreversible changes and undesirable interactions with electrolyte (as discussed in more detail below), may be simplified.

Various methods may be used for fluoride synthesis and infiltration into a conductive, nanoporous scaffolding matrix. Most of the fluorides can be synthesized by relatively simple reactions. A first group of such reactions involves a reaction between an oxide (e.g., metal oxide) and a hydrofluoric acid (HF) either in a gaseous or liquid (solution in water) form. The main feature of this process is that the metal does not change its oxidation state. Typically, this process may be used to obtain fluorides of the metals in their lower oxidation state (e.g., $Sn^{2+}$, but not $Sn^{4+}$). Sometimes, in the case of water-soluble fluorides, HF can be reacted directly with the metal (e.g., Zn) to form the metal fluoride (e.g., $ZnF_2$) solution. Such a solution can be infiltrated into the pores of a matrix and dried to form fluorides confined within the matrix pores of a scaffold.

A second route to obtain metal fluorides is a reaction between metal or metal oxide with fluorine or fluorinating agents. Examples of the latter include, but are not limited to, diethylaminosulfur trifluoride, tris(dimethylamino)sulfonium difluorotrimethylsilicate, and Xe fluorides. Because of the strong oxidizing nature of fluorine, the oxidative state of the metal in the resulting fluoride is usually the highest ($2Sb^{3+}+5F_2 \rightarrow SbF_5$). Another very general route to synthesize water insoluble fluorides within the pores of a conductive matrix is an ion exchange reaction between a soluble salt of a fluoride-forming element (e.g., a transition metal) with water-soluble fluoride (typically fluoride of alkali metals). Because of the non-solubility of the transition metal fluoride, the latter precipitates during reaction. The oxidation state of the transition metal does not change during the ion exchange reaction. The advantage of this method is the exclusion of highly toxic and corrosive $F_2$ and HF from the process. Also, by varying concentration of the reagents, order of their mixing, and addition of surfactants, the size of the obtained fluoride particles can be tuned over a wide range.

Yet another method for fluoride infiltration into scaffold pores involves the use of a soluble fluoride precursor. Such a method may include the following steps: (i) preparation of a solution of a fluoride precursor, (ii) infiltrating such a solution into the scaffold pores, (iii) subsequent solvent evaporation (steps ii and iii may be repeated multiple times to achieve high fluoride loadings), and (iv) thermal annealing to decompose a fluoride precursor into a fluoride and a volatile specie, which can be removed. For example, an aqueous solution of a salt of a fluorosilicic acid (e.g., $FeSiF_6 \cdot H_2O$) can be impregnated into the scaffold pores, dried, and the produced salt can be transformed into a metal fluoride (e.g., an iron fluoride $FeF_2$) by annealing (for examples, in an inert argon (Ar) gas). The annealing process decomposes $FeSiF_6 \cdot H_2O$ into $FeF_2$ (more generally $FeF_x$), water vapors, and volatile $SiF_4$ ($SiF_4$ boiling point=86° C.), with volatile compounds being removed. In some cases, initial annealing in an oxygen-containing gas may induce formation of the $FeF_3$ from the same precursor. The process of metal fluoride (MF) infiltration may be repeated multiple times to achieve the desired fraction of MF in the composite.

As mentioned above, for soluble salts the simplest method of their infiltration into the porous scaffold may involve the following steps: (i) wetting the scaffold with a salt solution in solvent with (ii) subsequent solvent evaporation. This procedure can also be repeated one or more times in order to increase loading of the scaffold with the fluoride material. Solutions of different fluorides can be combined or alternatively applied in order to obtain mixed fluoride compositions within the scaffold. Solvent-insoluble fluorides can be prepared in the form of a suspension of small nanoparticles in suitable liquid media. Then, the porous scaffold may be soaked with a nanoparticle suspension and the liquid evaporated. In order to increase metal fluoride loading, the procedure may be repeated. The size of such particles should generally be smaller than the size of the pores. In some cases, impregnation with solution and suspension can be combined for the purpose of filling the scaffold with a mixture of different compounds. This might be necessary for the enhancement of material capacity or improvement of rate performance.

In yet another approach, a fluoride can be formed directly within the scaffold pores, using a reaction between a fluoride precursor (such as metal oxide, metal hydroxide, or metal nanoparticles) with HF, $F_2$, or a solution of a fluorinating agent. The precursors can be introduced into the scaffold by solution impregnation, soaking of the scaffold with precursor suspension, vapor infiltration (capillary condensation) of volatile Me compounds, and other routes. After impregnation with a fluoride precursor, the scaffold can be subjected to HF vapor, $F_2$, or HF solution in the case of forming of insoluble fluorides. In many cases, the fluorinating agent can be soluble in organic solvents, such that the formed fluoride remains within the scaffold pores.

In the case of relatively volatile metal fluorides (e.g., $SbF_5$, $SbF_3$, $BiF_5$, $SnF_2$, and others), scaffold filling with the active material can be performed by capillary condensation of the fluoride vapor. Because of capillary action, vapor is preferentially condensed into scaffold capillaries, starting from the smallest pores, which exhibit the strongest interactions with the vapors. Because a typical desired scaffold pore size may be on the order of nanometers (e.g., about 1 nm to about 10 nm), it is possible to obtain conditions for very selective in-pore condensation, avoiding any condensation on the outside surface of the scaffold or in larger pores.

In yet another approach, fluoride nanoparticles (including agglomerated nanoparticles forming porous bodies) may be first produced and then infiltrated with a precursor for the scaffolding matrix material. In some examples, a polymer or a blend of polymers (or co-polymers) may be used as a precursor for the scaffolding matrix. Upon thermal treatment, the precursor may transform into the porous conductive scaffolding matrix. An outer protective coating may further enclose the produced composite fluoride-comprising particles, as described further in more detail for various types of the fluoride and scaffolding matrix comprising particles.

Depending on the particular application, the scaffold material can be filled with various active materials. Combinations of the above-described methods accordingly provide the ability to achieve a wide range of desired composition and morphology of the active particles within the scaffold.

The porosity of the scaffolding matrix need not be uniform. Moreover, in some example designs, the relative changes in the average pore fraction of the conductive matrix from the center to the surface of the particles may provide unique advantages. For example, having a larger pore volume in the center (or the bulk) of the particle may allow higher MF loading and higher energy density. At the same time, having a smaller pore volume near the surface of the particle may provide improved mechanical stability of the composite particle. It may also facilitate the formation of more conformal and more stable protective coatings. Such a coating may infiltrate into at least some of the pores of the MF-infiltrated scaffolding matrix.

FIGS. 4A-4B are graphical depictions illustrating four particular examples of a porous scaffolding matrix with different relative changes in the average pore fraction of the matrix from the center to the surface of the particles (different profiles of the pore volume). In the design of FIG. 4A, the bulk of the pore volume is more or less uniform in the bulk of the particle, but is substantially reduced near the surface layer. In the design of FIG. 4B, the porosity of the matrix material gradually decreases from the center to the surface of the particle. In the design of FIG. 4C, the top surface layer may comprise a different morphology and composition. Two or more layers may be present near the surface, to achieve improved performance, where the near-surface layer(s) may comprise a larger pore volume than the top surface layer. In the design of FIG. 4D, the near-surface layer may comprise a smaller pore volume than the top surface layer. In this case, a protective coating may first seal the MF-infiltrated matrix particle in the near-surface layer, while the larger pores of the top surface layer may prevent sintering of the particles during coating formation.

Figure 5:
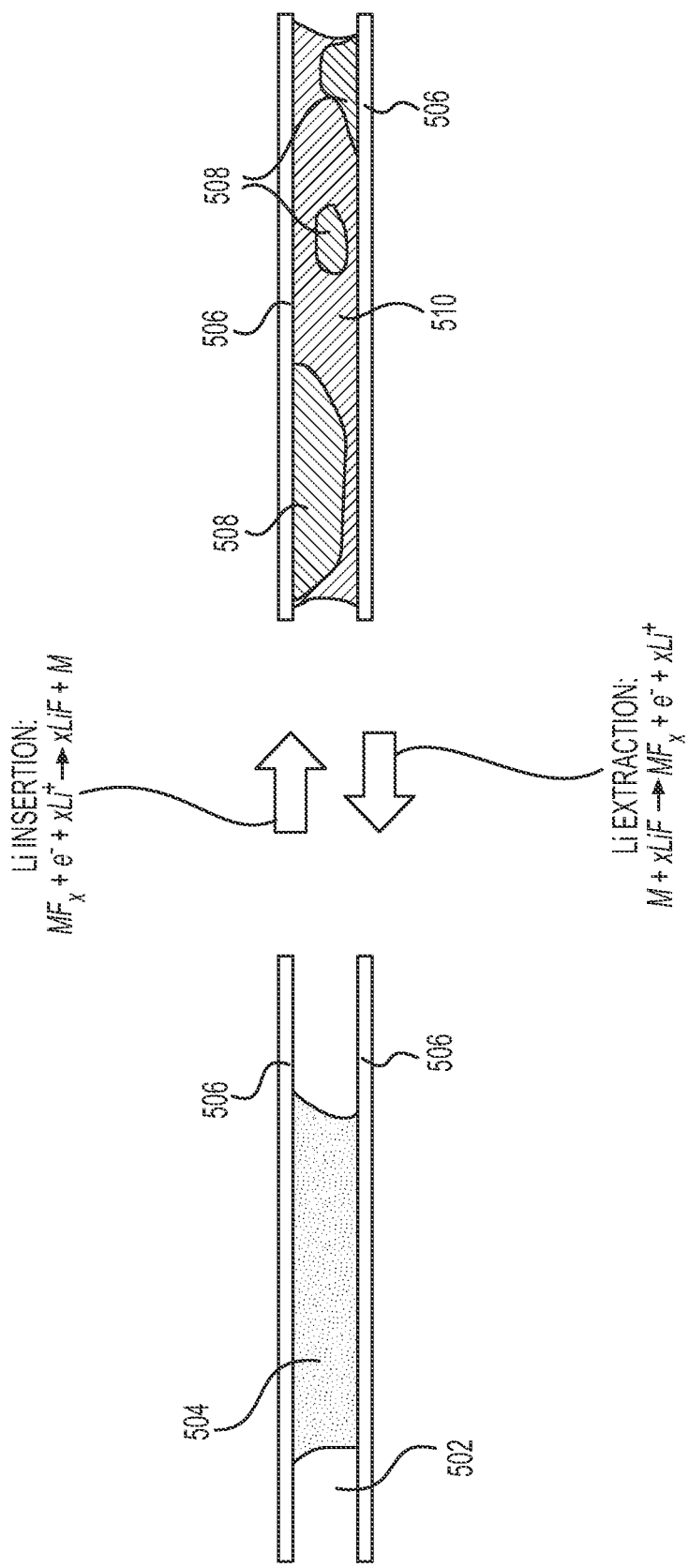
FIG. 5 illustrates a schematic of charge and discharge processes within an example pore, where Li ions react with metal fluoride nanoclusters to form nanoclusters of a fluoride-forming element and nanoclusters of LiF.

FIG. 5 illustrates a schematic of charge and discharge processes within an example (single) pore, where Li ions react with a fluoride confined within the pore, forming nanoclusters composed of a fluoride-forming element and nanoclusters of LiF. In the illustrated example, the composite material cycles between (i) a first state comprising a pore 502 (e.g., less than about 6 nm) and fluoride (MFx) 504 within pore walls 506 and (ii) a second state comprising clusters of a fluoride-forming element(s) (M) 508 interspersed with LiF 510 within the pore walls 506.

Even when the produced fluoride forming elements (e.g., nanoclusters of Cu in the case of $CuF_2$) are not connected to each other, they remain within the electron tunneling proximity of conductive pore walls. As a result, the electrons needed for the reactions of Eq. 1 can be provided by the conductive matrix. In addition, the confinement of the reaction species within the pore walls enhances the contact between a cluster of F element(s) (e.g., nanoclusters of Cu in the case of $CuF_2$) and LiF, which improves the rate of electrochemical reactions (as evidenced by Eq. 1). Finally, the interactions with the pore walls may reduce the dissolution of the cathode active material into the electrolyte.

Formation of chemical bonds between fluoride cluster(s) and the pore walls may be beneficial in some designs. For example, such bonds limit the movement of clusters of LiF and fluoride forming element(s) within the pores during battery operation, improving the long-term stability of the fluoride porous matrix composite. Such bonds may form during fluoride infiltration into the functional groups' decorated porous matrix and may involve other species, such as oxygen or sulfur atoms.

In some applications, reaction(s) of either fluorides or fluoride-forming elements (such as metals) with the electrolyte may cause undesirable side reactions, such as electrolyte oxidation, formation of gases, or dissolution of the fluoride-forming elements into the electrolyte as a result of chemical or electrochemical etching. The electrolyte decomposition may form a film, which may prevent or slow down reversible transformations during battery operation. Formation of gaseous species may result in undesirable cell expansion and additionally reduce the rate capability of the cell. Dissolution or etching of active material elements reduces the cathode capacity. In order to overcome such problems, the protective layer discussed above may conformally encase the fluoride-infiltrated porous matrix core in such a way as to avoid direct contact between the electrolyte solvent species and fluoride as well as fluoride-forming elements. The surface diffusion of Li ions is typically faster than their diffusion within the bulk of the material. In some cases, even though the pores are free from electrolyte, the diffusion of Li ions into/out of the fluoride porous matrix composite is sufficiently fast to allow for battery operation at sufficiently fast rates (for a given application). In this case, the outer surface area of the scaffolding matrix may be used for the deposition of an ionically conductive (and solvent impermeable) outer shell, thereby sealing the active material deposited inside the scaffolding matrix and avoiding the often undesirable contact of active material with solvent molecules of the electrolyte.

Figure 6B:
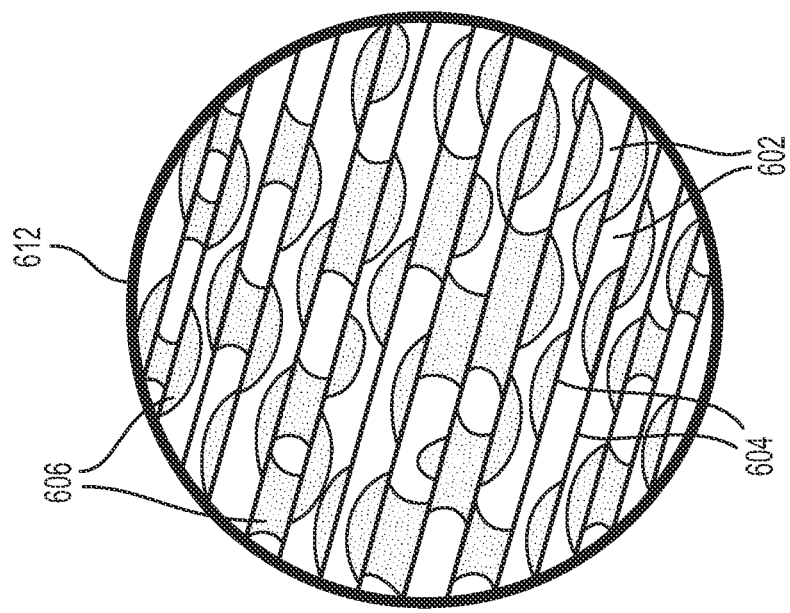
FIGS. 6A-6B illustrate two particular examples of fluoride-containing composites, where active fluoride nanoparticles or active fluoride nanoplatelets are infiltrated into a scaffolding matrix of a nanoporous material, and where the overall fluoride-matrix composite particle is further coated with a protective layer of electrolyte solvent-impermeable shell material conductive to Li ions.
Figure 6A:
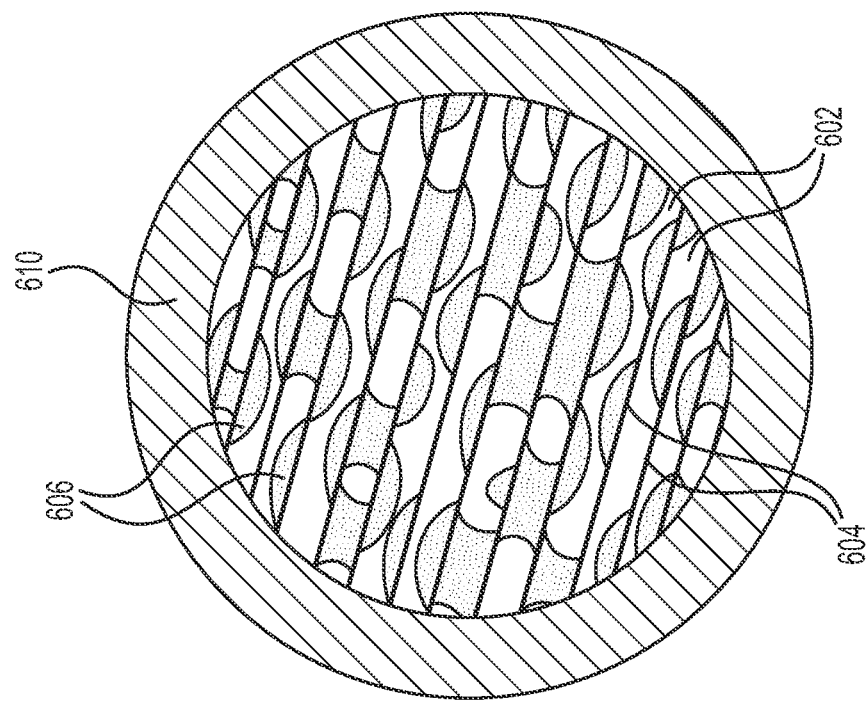

FIGS. 6A-6B illustrate two particular examples of fluoride-containing composites, where active fluoride nanoparticles or active fluoride nanoplatelets are confined within a conductive matrix of a nanoporous material, and where the overall fluoride matrix composite particle is further coated with a protective layer of electrolyte solvent-impermeable shell material conductive to Li ions. In each of the illustrated example designs, a composite particle comprises pores 602 (e.g., less than about 10 nm), conductive pore walls 604 of the particle core, fluoride 606 infiltrated within the pores 602 of the particle core, and a respective shell, such as an "active" shell 610 that is electrolyte solvent impermeable and composed of another active (Li-ion storing) but intercalation-type material, which serves several purposes, or an "inactive" shell 612 that is electrolyte solvent impermeable (but permeable to Li ions) and protects the fluorides from undesirable reactions with electrolyte.

In some examples, a protective shell material may comprise one of the following types of materials: an oxide, an oxyfluoride, a sulfide, a fluoro-sulfide, an oxysulfide, a fluoride, a non-fluoride halide, a nitride, an oxynitride, a hydride, a polymer, or a carbon In more detail, FIG. 6A illustrates an example of fluoride-containing composites having an "active" material shell also capable of storing Li ions during discharge of a Li battery or a Li-ion battery. FIG. 6B illustrates an example of fluoride-containing composites having a largely "inactive" material shell not capable of storing more than, for example, 50 mAh/g of Li within the voltage range to which the fluoride-matrix composite particles are exposed during battery operation. In some applications, it may be advantageous for the shell material to exhibit relatively small volume changes during insertion and extraction of Li ions. Therefore, in cases when a protective shell is an "active" material, it may be advantageous for this material to store Li ions by intercalation within the potential range of cathode operation, as intercalation reactions generally involve relatively small volume changes.

In some cases, it may be advantageous for the protective shell to be "multi-functional" by: (i) having the ability to transport Li ions and at the same time prevent transport of solvent molecules to the fluoride-containing core, (ii) having an additional function to store Li ions (to serve as an active material) within the operating potential range (as previously illustrated by FIG. 6A), (iii) providing additional mechanical strengthening functionality (to help minimize volume changes within the particle during Li-ion insertion), and (iv) enhancing electrical conductivity (to contain an electrically conductive outer layer, such as a conductive polymer layer, conductive carbon layer, conductive metal layer, or conductive oxide layer).

In some applications, it may be advantageous for the protective shell to be a composite. The shell may be a composite material comprising at least an inner layer and an outer layer, with potentially one or more other layers therebetween. The shell may accordingly be made by combining different coatings and different layers may be provided for different functions. For example, one component of the shell may provide better structural strength, and another one better electronic conductivity. In another example, one component can provide better ionic conductivity, and another one better electrical conductivity. In some applications, it may be advantageous to have these components interpenetrate each other. In this case, the composite shell may provide both high ionic and electrical conductivity if one component is more electrically conductive and another one more ionically conductive.

Further, a portion of the porous scaffolding matrix of the core can be left exposed and, therefore, be used for the stable attachment of a (polymer) binder. A polymer binder may also be firmly attached to a protective shell. A more stable particle-binder interface may lead to more stable performance of the electrode.

Figure 7B:
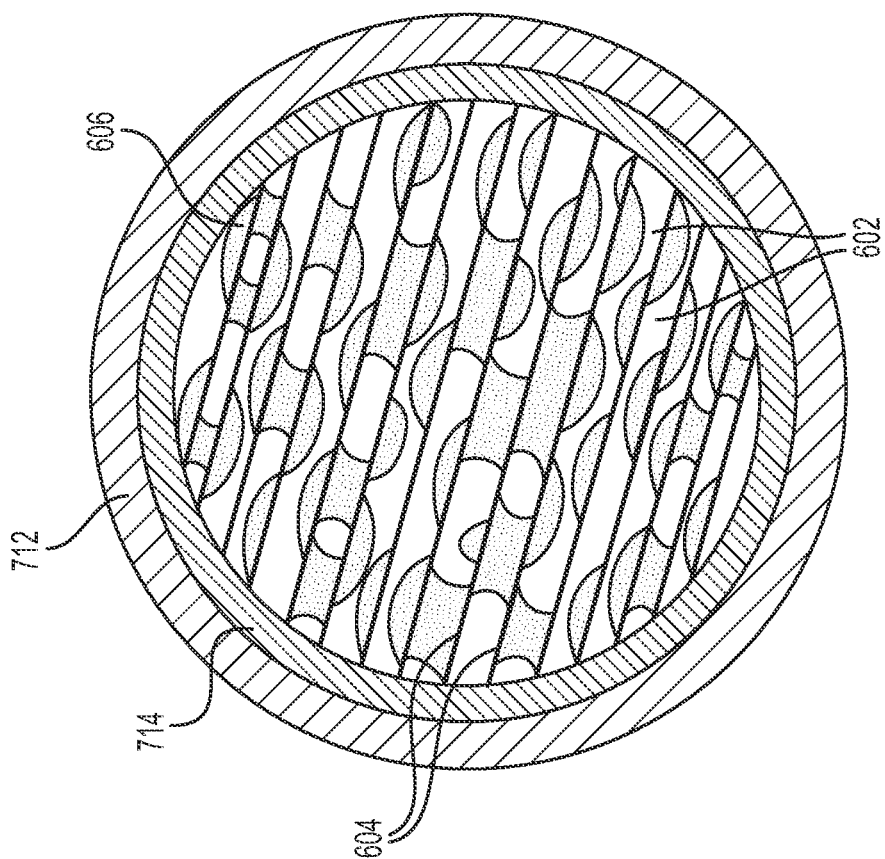
FIGS. 7A-7B illustrate two particular examples of fluoride-containing composites with a protective shell layer being a composite material according to various embodiments.
Figure 7A:
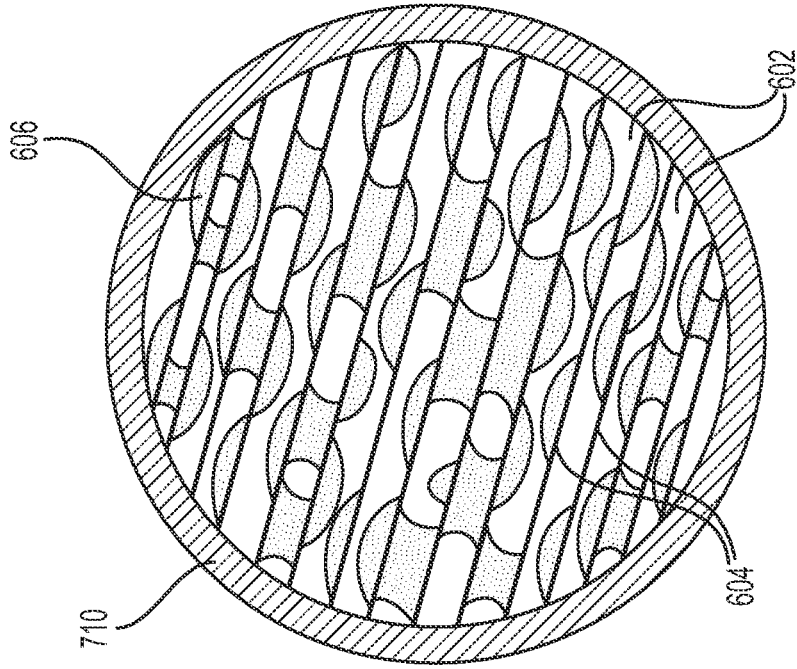

FIGS. 7A-7B illustrates two particular examples of fluoride-containing composites with a protective shell layer being a composite material according to various embodiments. As in the example designs of FIG. 6, each of the illustrated example designs here includes a composite particle that comprises pores 602 (e.g., less than about 10 nm), conductive pore walls 604 of the particle core, and fluoride 606 infiltrated within the pores 602 of the particle core. In addition, each of the illustrated example designs here includes a respective composite shell, such as an "interpenetrating" composite shell 710 that is electrolyte solvent impermeable and based on a composite of intercalation-type material impregnated within the porous scaffold of electrically conductive material, or a combination of an outer protective shell layer 712 that is composed, for example, of an intercalation-type material, and an inner protective shell layer 714 that is a composite of fluoride impregnated within a porous scaffold of electrically conductive material.

In more detail, FIG. 7A illustrates a conformal shell composed of an intercalation-type active material (for example, a lithium metal oxide or a lithium metal phosphate) interpenetrating a porous electrically conductive material (for example, carbon). FIG. 7B illustrates a conformal shell composed of two layers: (i) an outer layer of intercalation-type active material and (ii) an inner layer of a metal fluoride infiltrated into an electrically conductive porous shell. One advantage of having a fluoride-filled electrically conductive porous shell is that if the pore size in such a shell is smaller than that of the porous conductive matrix core, it becomes easier to "seal it" (making it impermeable to solvent molecules) with a Li-ion conductive material, without impregnating significant amounts of such material into the core.

In some applications (for example, when the particle size is large or when the Li ion transport with the electrolyte-free porous fluoride-containing core is slow) it is advantageous to have so-called "channel pores" (e.g., greater than about 6 nm) within the fluoride-containing composite particles, which provide more rapid transport of ions from the outside of the particles to their core.

FIG. 8 illustrates two particular examples of fluoride-containing composites according to various embodiments, where a fluoride-conductive core contains both relatively small (e.g., smaller than 6 nm) pores to confine fluorides and relatively large "channel" pores (e.g., greater than 6 nm) designed to provide rapid transport of ions from the electrolyte solution into the core of the particles. As in the example designs of FIG. 6, each of the illustrated example designs here includes a composite particle that comprises pores 602 (e.g., less than about 6 nm), conductive pore walls 604 of the particle core, and fluoride 606 infiltrated within the pores 602 of the particle core, with or without a protective shell 610. In addition, each of the illustrated example designs here includes channel pores (e.g., greater than about 6 nm) for fast Li ion access to the core.

Figure 8B:
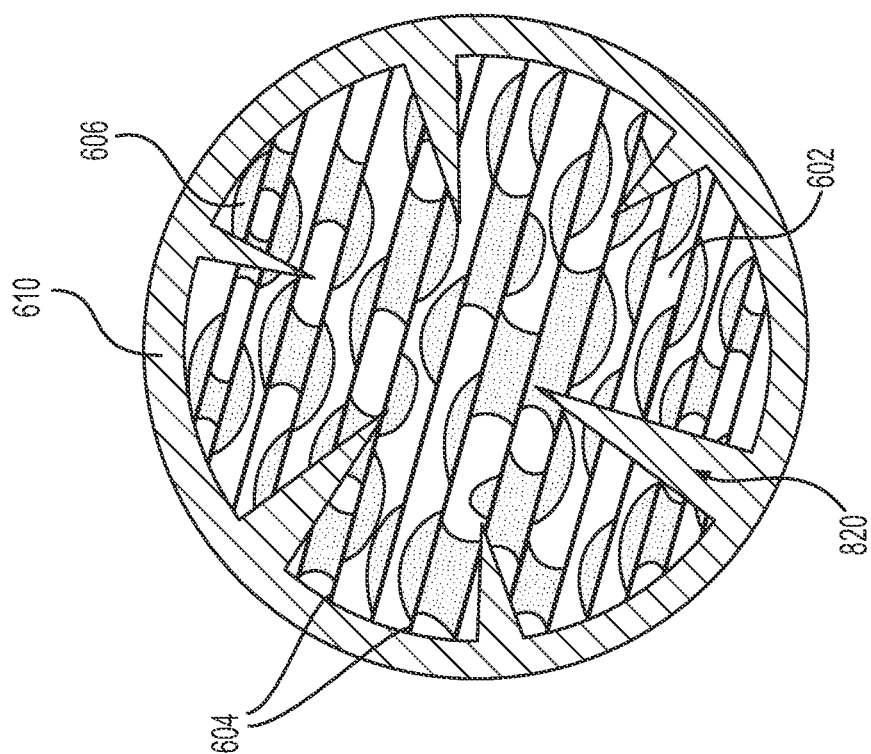
FIGS. 8A-8B illustrate two particular examples of fluoride-containing composites according to various embodiments, where a fluoride-conductive core contains both relatively small (e.g., smaller than 6 nm) pores to confine fluorides and relatively large "channel" pores (e.g., greater than about 6 nm) designed to provide rapid transport of ions from the electrolyte solution into the core of the particles.
Figure 8A:
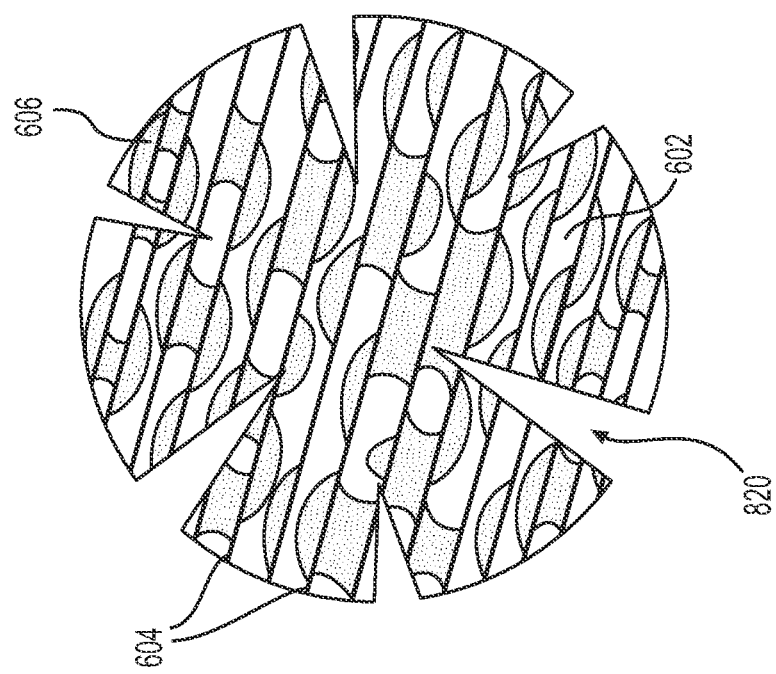

In more detail, in FIG. 8A these channel pores are not filled with active material or a solid electrolyte so that the ion transport in such pores proceeds in a liquid phase (that is, via liquid electrolyte filling the pores). In FIG. 8B these channel pores are filled either with an active material having high ionic conductivity or a solid electrolyte so that the ion transport in such pores proceeds via a solid phase. In this case, the filled channel pores may provide an additional mechanical strengthening function, further assisting particles to maintain constant size and avoid fracture during Li ion insertion and extraction.

In some applications, it may be advantageous to keep the dimensions of the battery (e.g., a thickness of a pouch cell) as constant as possible during battery operation. However, high capacity electrodes, such as anode particles based on a Li alloy-type active material or cathode particles based on conversion-type active material, may exhibit some volume changes during Li shuttling between the anode and cathode. Some of the volume changes may be minimized by using some of the approaches described herein, in accordance with a porous scaffolding matrix that exhibits relatively little volume changes during Li ion insertion/extraction. However, some of the volume changes may remain in at least one of the electrodes. Such thickness and volume changes may be introduced even intentionally in order to maximize the electrode's volumetric energy storage characteristics. In order to further prevent changes in thickness at the cell level, the expansion of both electrodes may be tuned in such a way as to compensate for the total volume changes and bring them to an acceptable level (e.g., to below 3% in some applications).

In some designs, it may be advantageous to introduce a gradual change in the concentration of the protective material from the center to the surface of the composite particles. In this case, the overall stability of the particles may be enhanced. The lack of abrupt compositional changes makes the particles more resilient against fractures during handling and electrode preparation. In addition, even with the formation of surface cracks, the protection may still function efficiently for at least a portion of the individual particle. A higher fraction of the protective material (e.g., intercalation-type active material) near the surface of the particle may help to improve particle stability, while a lower fraction of the active material in the center of the particles may help to improve particle energy density.

FIGS. 9A-9D illustrate four particular examples of MF-filled conductive matrix particles additionally comprising protective material, such as intercalation-type active material or simply a Li-ion conductive material (which may exhibit low capacity, e.g., lower than about 50 mAh/g in the potential range of particle operation in a battery cell) that prevent undesirable reactions with electrolyte and improve battery cell stability and performance. As in the example designs of FIG. 6, each of the illustrated example designs here includes a composite particle that comprises pores 602 (e.g., less than about 6 nm), conductive pore walls 604 of the particle core, and fluoride 606 infiltrated within the pores 602 of the particle core, with or without a protective shell 910, composite shell 912, additional coatings 914, and so on. In addition, each of the illustrated example designs here includes a gradient filling 930 of intercalation-type material that may protect the MF from undesirable interactions with electrolyte. In these examples the volume fraction of the MF may be either uniform within the scaffolding matrix or vary according to a specific profile (e.g., having smaller volume fraction of the MF near the surface of the particles).

Figure 9B:
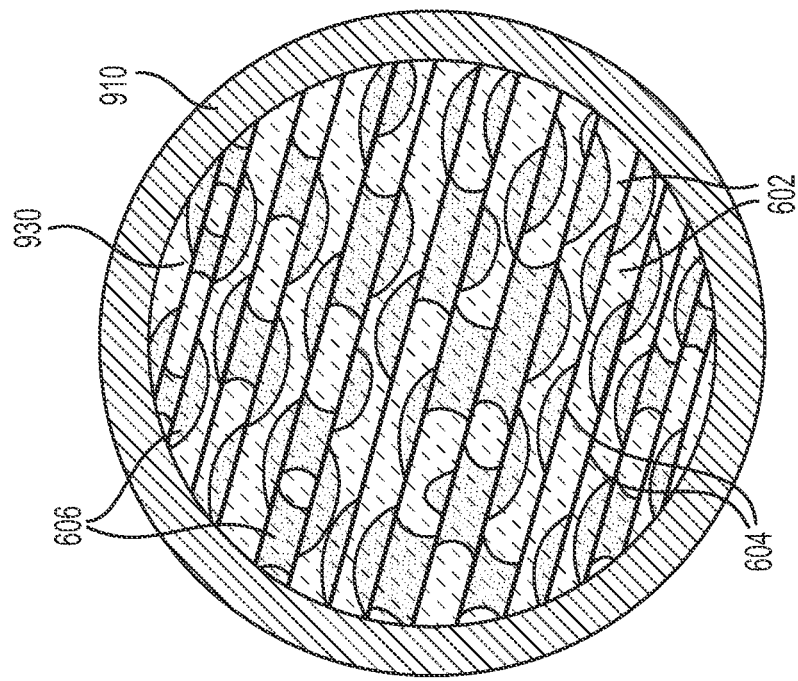
FIGS. 9A-9D illustrate four particular examples of metal fluoride containing composites in various embodiments, where the composites additionally comprise intercalation-type active materials or surface protective materials, where the relative mass fraction of such materials form a gradient from the core to the surface of the particles, and where a higher concentration of the protective (or intercalation-type active) materials is near the surface of the particles.
Figure 9A:
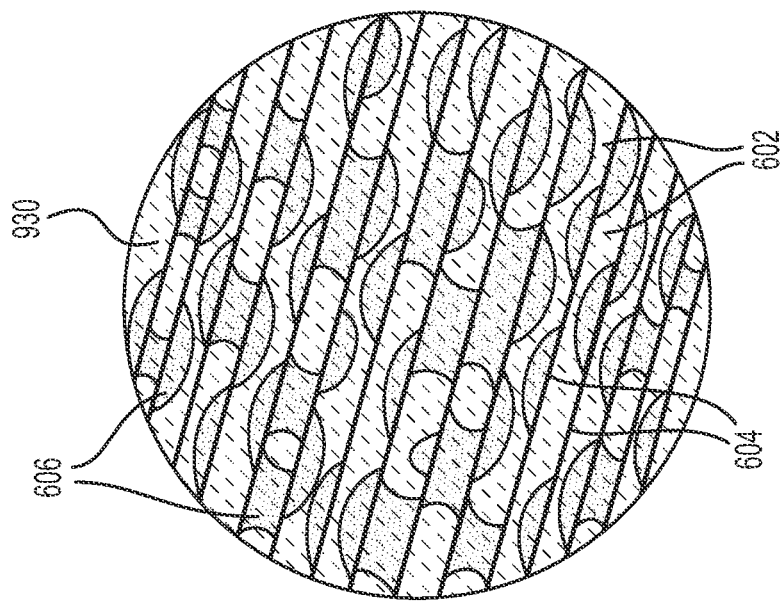

In more detail, FIG. 9A illustrates a simplest case of MF-infiltrated scaffolding matrix particle gradually filled with the protective coating material. FIG. 9B illustrates an example of a similar material having an additional layer of a thicker protective coating material on the outer surface of the particles. Such a layer may preferably contain as small fraction of the MF as feasible. However, some content of MF might be unavoidable during synthesis. A suitable thickness of the surface layer may range, for example, from about 2 nm to about 200 nm. The volume fraction of the intercalation type material may be a compromise, as a higher fraction may lead to better stability and higher capacity, while a smaller fraction may result in a higher energy density of the composite particles. FIG. 9C illustrates a similar particle, but with an outer layer being a composite. In some examples, as previously described, such a composite may comprise two or more interpenetrating components (e.g., an electrically conductive component and a Li-ion storing component).

Figure 9D:
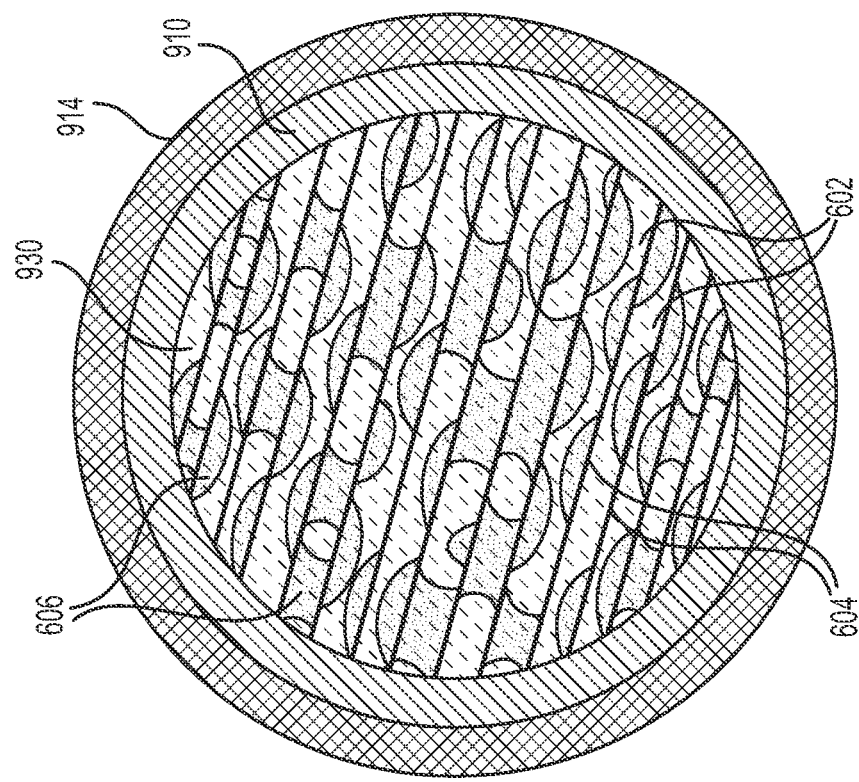
Figure 9C:
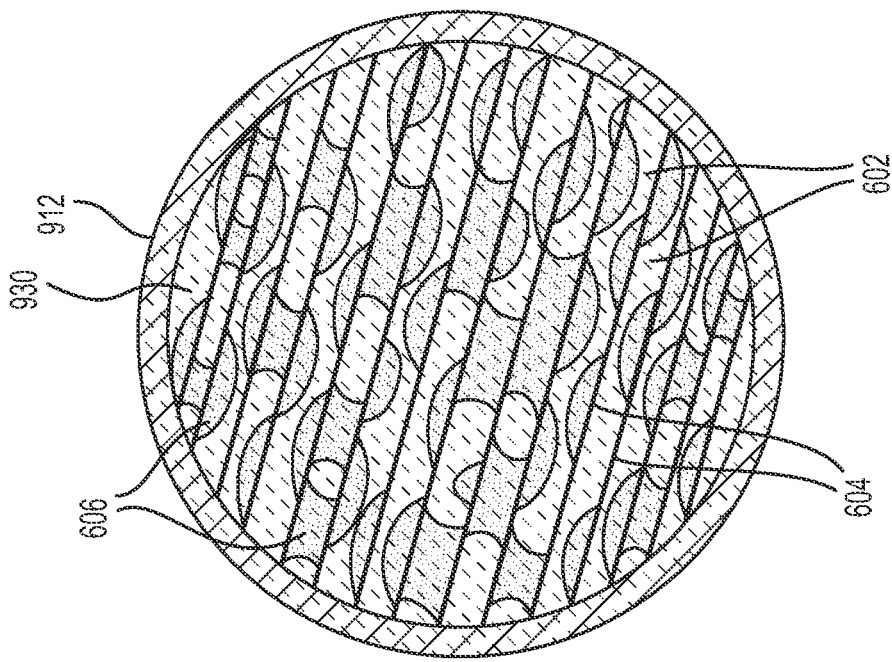

FIG. 9D illustrates another example, where the outer layer of the protective shell material may be additionally covered with a functional shell layer. Such a layer may serve different functions. For example, it may increase electrical conductivity of the material, improve interactions with the electrolyte, improve dispersion in a slurry, improve adhesion to the binder, or simply further improve mechanical stability of the particles. This layer should be permeable to the active material ions of interest (such as Li ions in the case of Li or Li-ion batteries). It may be continuous and conformal or discontinuous (e.g., composed of nanoparticles). Conductive polymers (particularly those that remain electrically conductive within the potential range of the electrode operation), conductive carbon (such as carbon comprising mostly $sp^2$ bonded C atoms), metals (e.g., transition metals, such as Fe, Al, and others, or, e.g., rare earth metals or their salts that largely do not dissolve in electrolyte), semimetals (e.g., Si, Sn, and others), metal sulfides (e.g., titanium sulfide, iron sulfide, and others), metal fluorides (particularly those that do not experience conversion reactions in the potential range of electrode operation and have low solubility in electrolytes), metal oxides, and mixtures of the above-discussed materials are examples of suitable compositions of such a functional layer.

In some designs, the protective coating may be formed directly on the surface of the metal fluoride (MF) active material dispersed within the conductive scaffolding matrix particles.

FIGS. 10A-10B illustrate two examples of a portion of a composite where MF is confined within the conductive material pore (e.g., a carbon pore) and additionally coated with a protective material coating layer 1010. As shown, the protective material coating layer 1010 may be formed as a coating on the MF surface (as in FIG. 10A) or as a coating of a second MF2 material on a first MF1 material surface (as in FIG. 10B). The suitable thickness of such a layer may depend on the size of the pore and the size of the MF particles. As an example, suitable thickness may typically range from about 0.2 to about 20 nm.

The volume fraction of the MF within the scaffolding matrix need not to be uniform. A reduced volume fraction of the MF near the surface of the conductive matrix particles may improve the mechanical and electrochemical stability of the particles when used in metal-ion batteries.

Figure 11A:
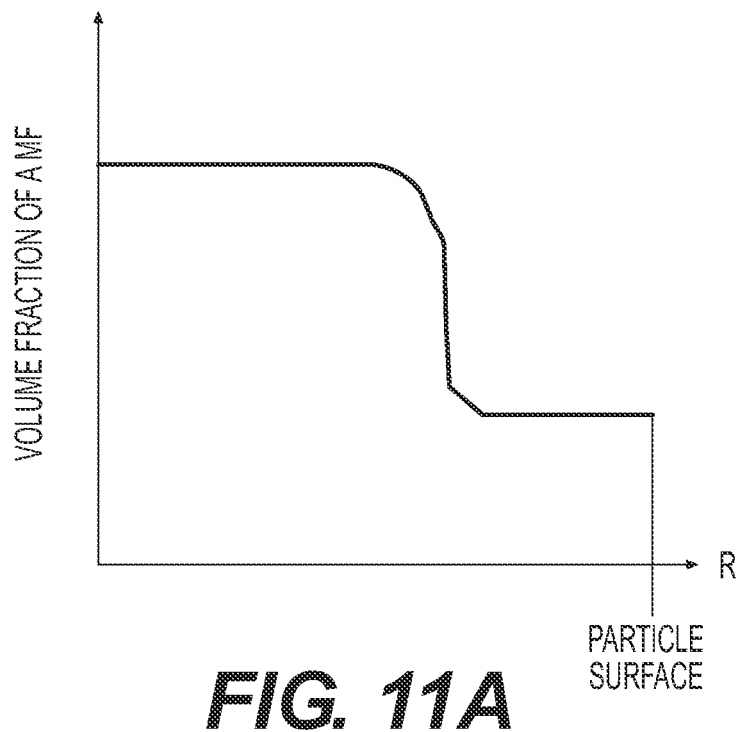
FIGS. 11A-11B illustrate two particular examples of the relative changes in the average mass fraction of the fluoride as a function of the distance from the center to the surface of a fluoride-comprising composite particle.
Figure 11B:
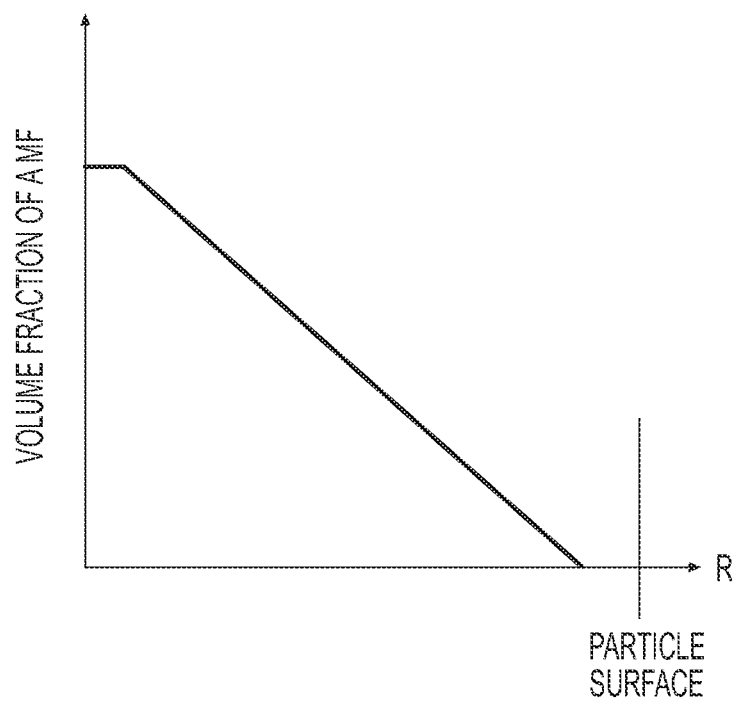

FIGS. 11A-11B illustrate two particular examples of the changes in the average volume fraction that may be occupied by the MF along the particle radius from the center to the surface of the particles in certain embodiments.

In some designs, the mass or volume fractions of the protective material distribution within the composite particles may also change from the center to the surface of the composite.

Figure 12A:
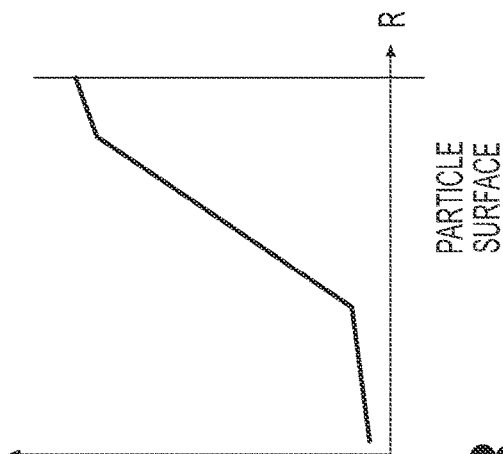
FIGS. 12A-12D illustrate four particular examples of relative changes in the average mass fraction of a protective material as a function of the distance from the center to the surface of a fluoride-comprising composite particle.
Figure 12B:
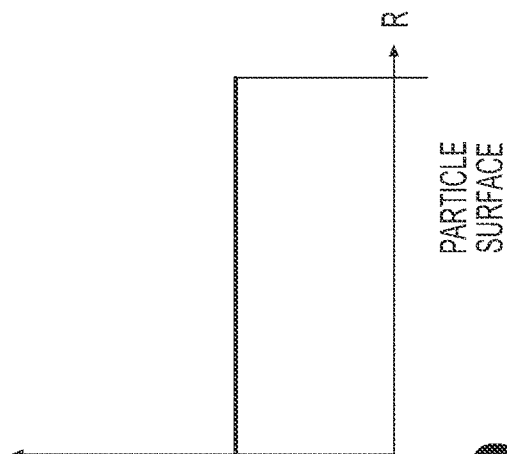
Figure 12C:
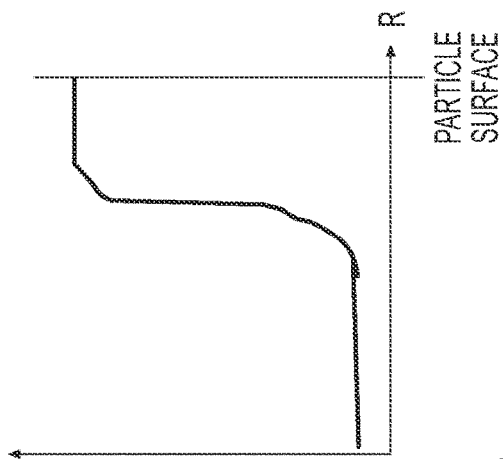
Figure 12D:
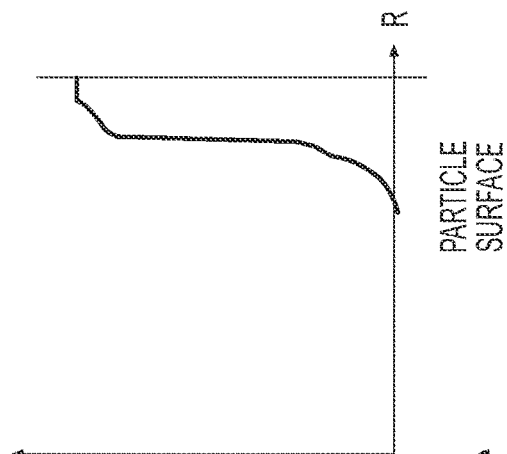
Figure 13A:
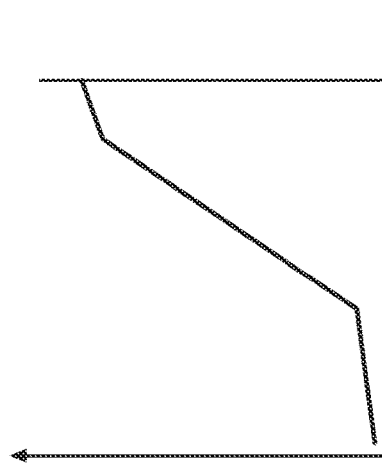
FIGS. 13A-13D illustrate four particular examples of relative changes in the average mass fraction of an intercalation-type active material as a function of the distance from the center to the surface of a fluoride-comprising composite particle.
Figure 13B:
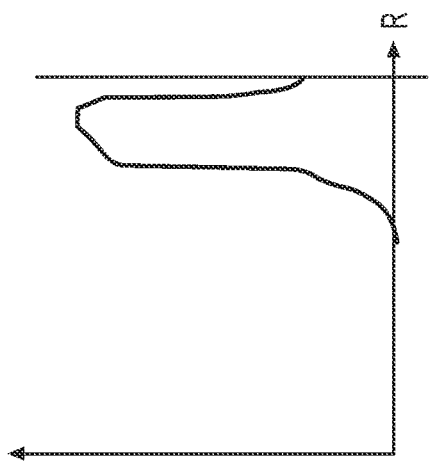
Figure 13C:
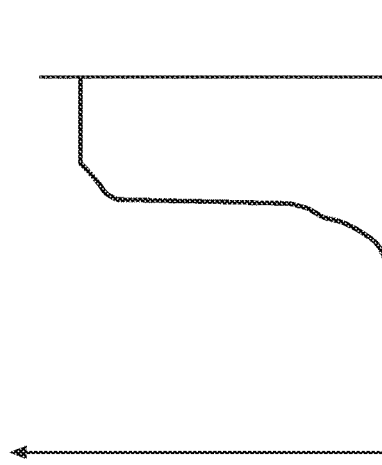
Figure 13D:
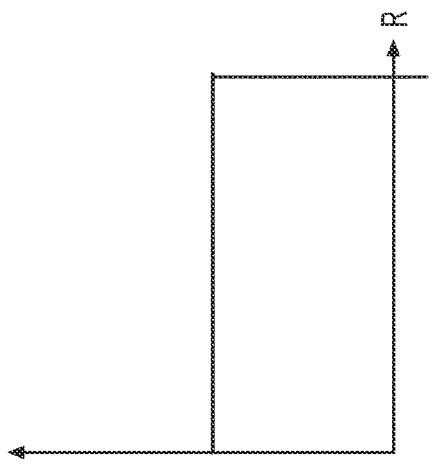

FIGS. 12A-12D illustrate examples of changes in the average mass fraction of the protective material along the radius of the composite particles. FIGS. 12A and 12B illustrate a growing fraction of the protective material near the surface and a smaller fraction of the protective material in the core of the particles. FIG. 12C illustrates an example where the protective material virtually disappears near the center of the particles and is mostly limited to the surface region. FIG. 12D illustrates an example where the protective material is uniformly distributed within a composite (e.g., when it is directly applied to the surface of the MF particles confined within the pores of the conductive matrix).

As discussed above, an intercalation-type active material may be incorporated into the MF-comprising composite particles. In some examples, such incorporation serves to improve stability of the MF (e.g., functioning as a protective layer). In other examples, such incorporation serves to provide high current in pulse regimes. Intercalation-type materials typically exhibit higher rate performance and thus their incorporation may allow high current pulses of the battery to be supported by the composite electrodes. Examples of suitable intercalation-type active materials are noted hereinabove. These intercalation compounds are often divided into several crystal structures, such as layered, spinel, olivine, and tavorite, to name the most common ones.

The layered structure is the earliest form of intercalation compounds for the cathode materials in Li-ion batteries and metal chalcogenides, including $TiS_3$ and $NbSe_3$, and have been studied previously as a possible intercalating cathode material. They do not serve as high energy density materials but may provide adequate power performance and protection for MF. Layered $LiCoO_2$, $LiMnO_2$, $LiNi_xMn_yCo_zO_2$, and $LiNi_xCo_yAl_zO_2$ (where x, y, and z range from 0 to 1) are more common in devices. Typical examples of a spinel include $LiCo_2O_4$ and $LiMn_2O_4$. Typical examples of olivine active materials include $LiFePO_4$, $LiCoPO_4$, and $LiMnPO_4$. Olivines belong to a broader class of polyanion compounds. Large polyanions (XO4)3− (X=S, P, Si, As, Mo, W) occupy the lattice and these anions, increase cathode redox potential, and stabilize its structure. Non-olivine polyanion intercalation-type active materials may also be used. Tavorites is a common example of none-olivine polyanion intercalation type active materials. Typical examples of tavorite materials include $LiFeSO_4F$ and $LiVPO_4F$.

As can be seen from the examples above, the majority of active materials may contain up to approximately 50 atomic % oxygen. Some of the suitable active materials also contain transition metal atoms, including Fe. Due to the low cost of Fe, the use of such an element in the protective material may provide cost advantages.

When designing composite materials comprising both MF and intercalation-type active materials, it may be advantageous to make sure the intercalation-type active material is electrochemically stable in the potential range of the electrode operation. In some examples, it may be advantageous for the active material to exhibit the highest capacity in the potential range of cathode operation (typically from above 1V vs. Li/Li+ to below 4-4.2 V vs. Li/Li+).

FIGS. 13A-13D illustrate four particular examples of MF-filled conductive matrix particles additionally comprising intercalation-type active material. In these examples, the fraction of the intercalation-type active material changes from the center to the perimeter (surface) of the composite particles.

The use of two or more types of metal fluorides within the composite particles may be advantageous in some applications. Some metal fluorides experience reduced dissolution in contact with electrolyte (at least when used in the potential range of cathode operation), more favorable interaction with electrolyte (e.g., forming a favorable and stable solid electrolyte interphase layer), form an interconnected network of metal nanoparticles during the conversion reaction (such that rate performance may be higher), or provide other attractive properties. At the same time, these metal fluorides may suffer from higher cost or lower energy density than other fluorides (for example, lower than that of $CuF_2$). Combining different types of metal fluorides into one composite may provide a combination of attractive properties, such as high energy density, high rate, and high stability performance.

Figure 14A:
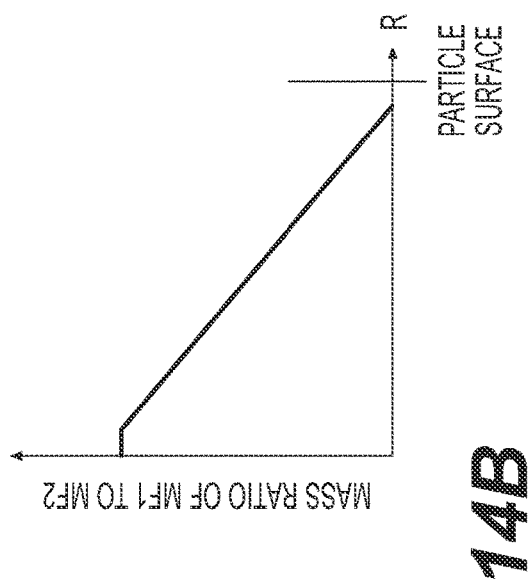
FIGS. 14A-14C illustrate three particular examples of relative changes in the average mass ratio of two metal fluorides (MF1 and MF2) as a function of the distance from the center to the surface of a composite particle comprising two different metal fluoride compositions, where one of the metal fluorides (e.g., MF1) provides higher energy density and another one (e.g., MF2) improves stability or rate performance of the composite.
Figure 14B:
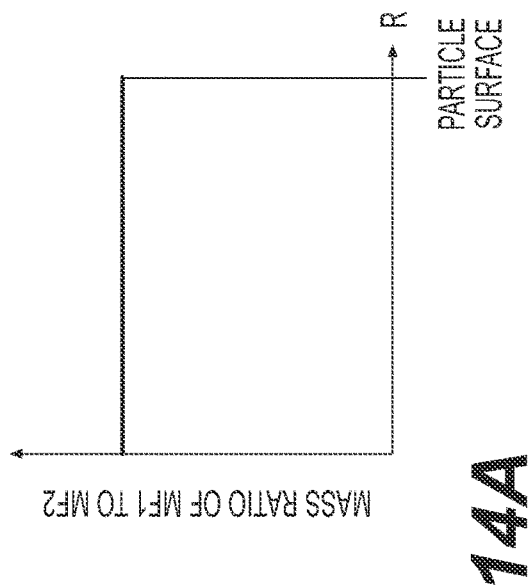
Figure 14C:
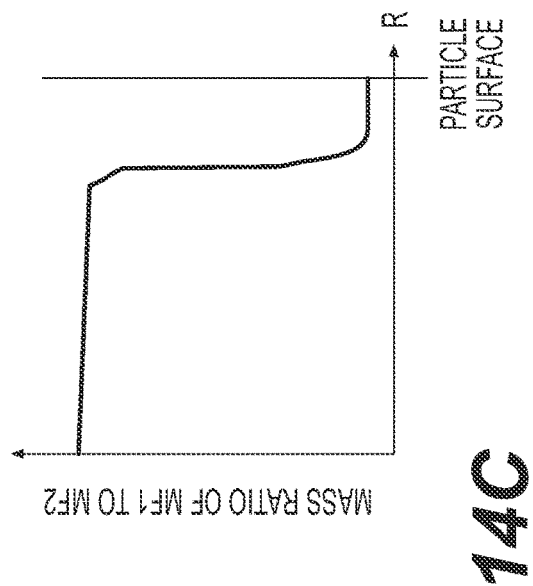

FIGS. 14A-14C illustrate three particular examples of a composite particle comprising a scaffolding matrix and two types of metal fluorides (MF1 and MF2). In FIG. 14A, the ratio of the mass fractions of the metal fluorides is uniform within the particle (no changes from the center to the perimeter of the particle). In FIGS. 14B and C, a higher content of MF2 is present near the surface of the composite particle.

Figure 15:
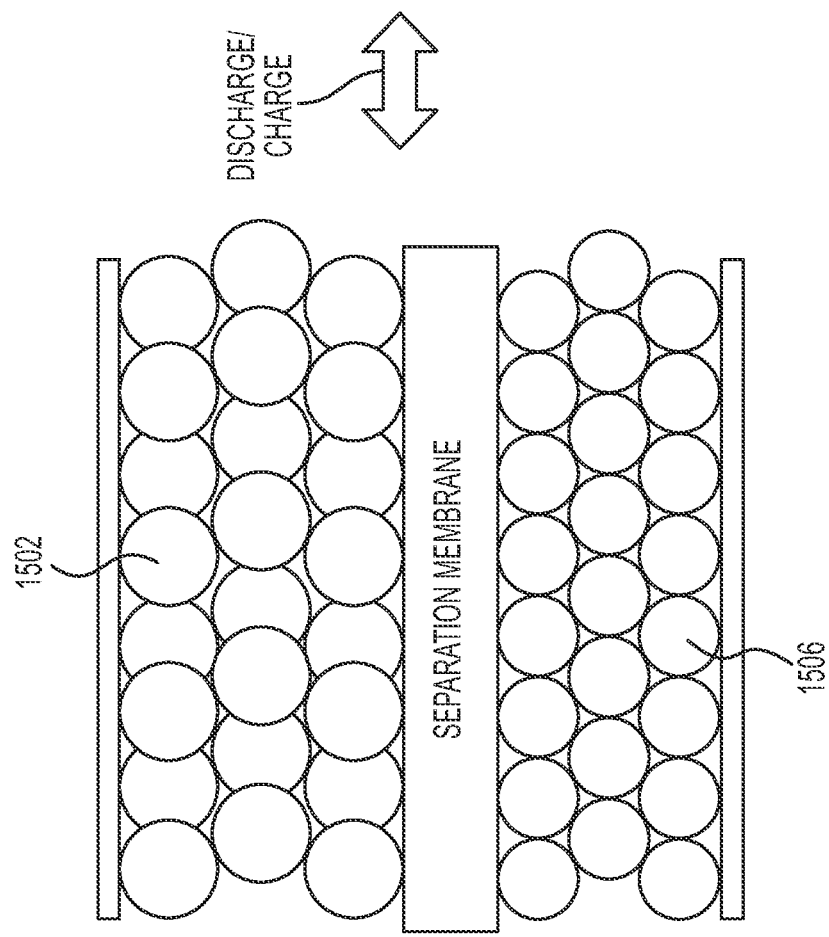
FIG. 15 illustrates an example of a building block of a Li-ion battery with volume and thickness changing electrodes (e.g., changes of over about 6 vol. % in each) designed to counter-balance changes in battery dimensions during battery operation.
Figure 15:
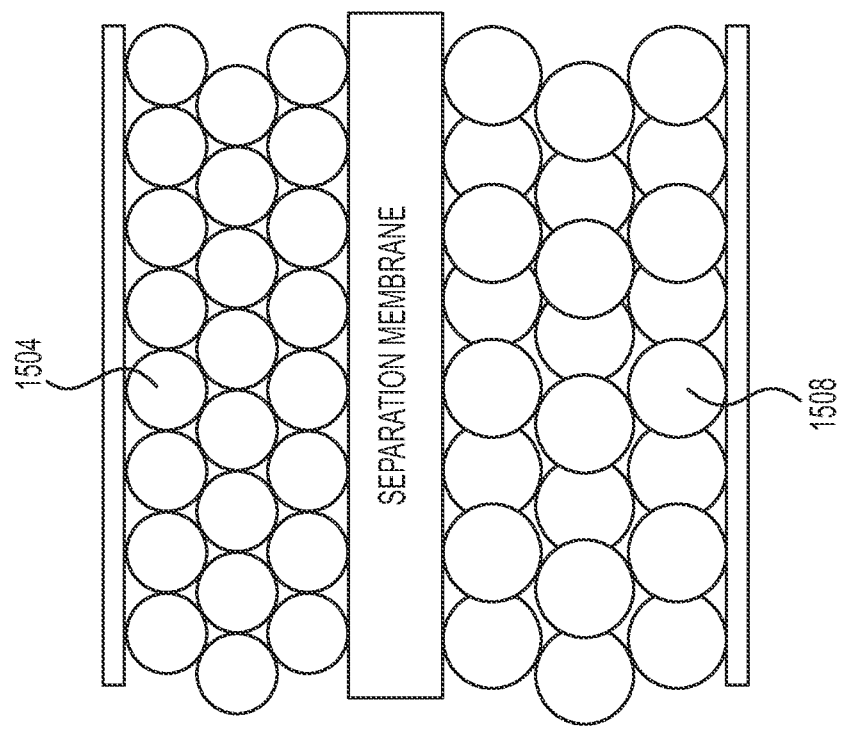

FIG. 15 illustrates an example of a building block of a Li-ion battery with volume and thickness changing electrodes (e.g., changes of over 6 vol. % in each) carefully designed to counter-balance the changes of each other and minimize the changes in the battery's dimensions during its operation. In this example, the cathode cycles between an expanded state 1502 and a compacted state 1504, while the anode cycles between a compacted state 1506 and an expanded state 1508. For example, if the anode exhibits a 10% increase in thickness during Li-ion insertion, the porosity and architecture of the cathode particles (shown, for example, in the porous particles of FIGS. 2-14) can be tuned such that the cathode shrinks by 7-13% during Li extraction. In this way, the overall volume changes remain below 3%.

In some applications, the use of a solid electrolyte or a solid electrolyte layer may provide benefits of improved stability.

Figure 16:
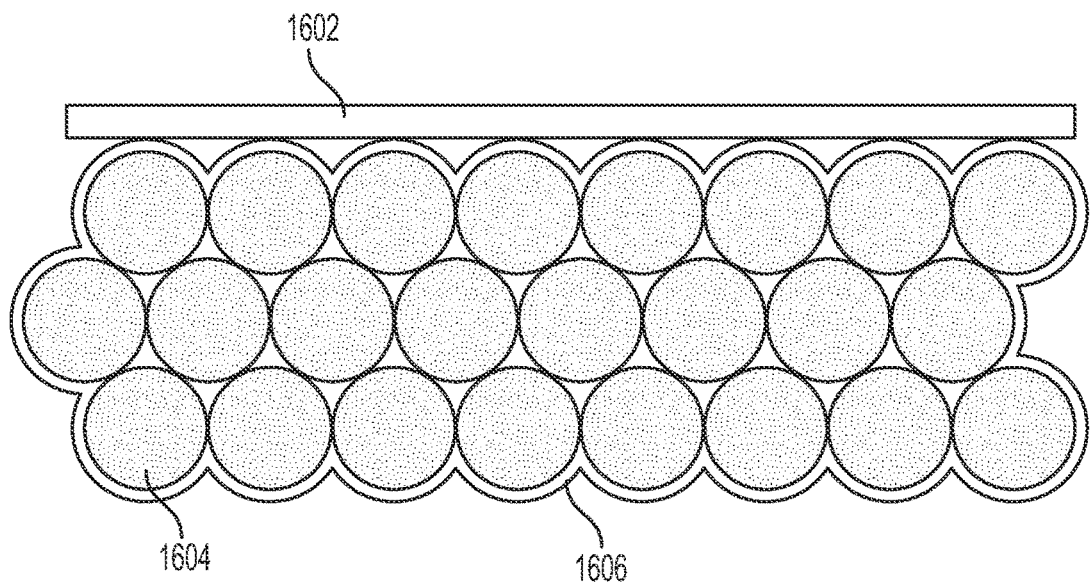
FIG. 16 illustrates a particular example of an electrode composed of fluoride infiltrated into a conductive scaffolding matrix of a nanoporous material, where the electrode is either further coated with a layer of a solid electrolyte or a solid electrolyte completely infiltrates the pores between the individual fluoride-containing composite particles.

FIG. 16 illustrates a particular example of an electrode comprising fluoride infiltrated into a conductive scaffolding matrix of a nanoporous material, where the electrode is either further coated with a layer of a solid electrolyte or a solid electrolyte completely infiltrates the pores between the individual fluoride-containing composite particles. As shown, the electrode may comprise a current collector 1602, composite fluoride-containing active particles 1604 exhibiting relatively very small (e.g., less than about 15%) volume changes during insertion and extraction of Li ions, and a solid electrolyte layer 1606 coating the electrode particles. Because the scaffolding matrix reduces the volume changes within the composite particles (compared to that of the plain MF), these composite particles may offer enhanced stability when combined with a solid electrolyte in battery cells.

In many of the figures discussed above, the shape of the particles is shown as near-spherical. In some applications, the use of irregularly shaped particles may offer reduced powder fabrication costs.

Figure 17:
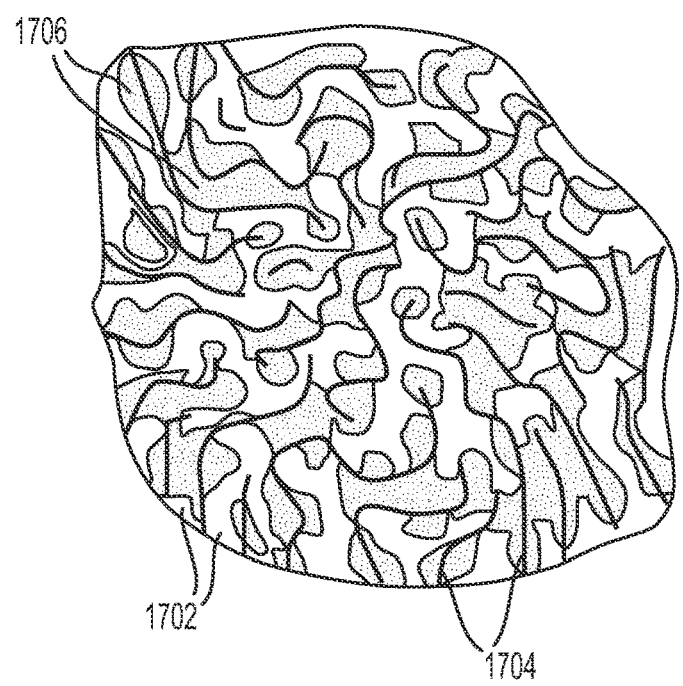
FIG. 17 illustrates a particular example of an irregularly shaped active particle comprising a fluoride infiltrated in a conductive nanoporous scaffolding matrix.

FIG. 17 illustrates a particular example of an irregularly shaped active particle comprising a fluoride infiltrated in a conductive nanoporous matrix. As in the example designs of FIG. 6, the illustrated example design here includes a composite particle that comprises pores 1702 (e.g., less than about 10 nm), conductive pore walls 1704 of the particle core, and fluoride 1706 infiltrated within the pores 1702 of the particle core. In other applications, the use of cylindrical, fiber-shaped, or platelet-shaped particles may offer certain benefits (such as higher electrical interconnectivity within the electrode or higher packing density).

In some designs, it may be advantageous to use porous scaffolding matrix particles with pores larger than 10 nm. Larger pores may be easier to uniformly fill with fluorides.

FIGS. 18A-18D illustrate four particular examples where utilizing scaffold particles with large pores may still be attractive. Pores as large as 500 nm, for example, may work in some designs. However, their performance may be a trade-off. In the illustrated example designs, each pore includes fluoride 1802 infiltrated within electrically conductive pore walls 1804, and variously includes an electrically conductive coating 1806, electrically conductive particles 1808, and/or electrically conductive segments 1810, which may encase fluoride clusters (nanoparticles).

Figure 18A:
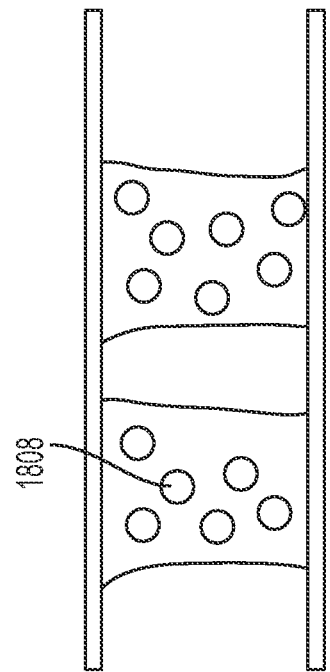
FIGS. 18A-18D illustrate four particular examples utilizing scaffold particles with large pores.

In more detail, FIG. 18A illustrates a large pore with clusters of metal fluorides coated with thin (preferably less than about 1 nm) layers of electrically conductive material (such as carbon) in order to provide paths for electron transport to electrically insulative fluorides, including LiF, needed for reversibility of electrochemical reactions (see Eq. 1).

Figure 18B:
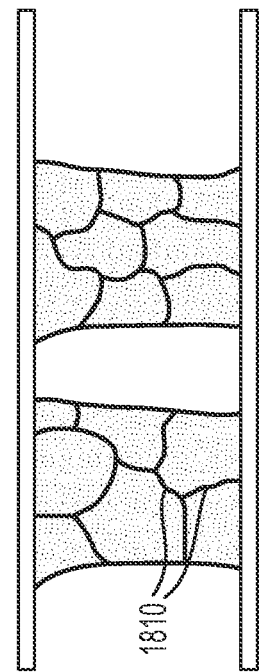

FIG. 18B illustrates an example where fluoride clusters (nanoparticles) contain electrically conductive nanoparticles (of various shape or composition). The conductive particles may comprise metals, conductive carbon, conductive ceramic particles, and others. In this case, electrons can tunnel from one conductive nanoparticle to another in order to participate in electrochemical reactions. Such particles may also serve another function—reducing mobility of the fluoride-forming element and LiF so that both of these materials remain in close proximity to each other so that reversible electrochemical reactions can proceed faster. Yet another potential function of such particles is to catalyze the electrochemical reactions to reduce the potential barrier and, therefore, reduce overpotential, thus increasing the energy efficiency of the battery cell and increasing the operating voltage (thus increasing energy density). In addition, reduction of the energy barrier for these transformations enhances the rate performance and power characteristics of the batteries.

Figure 18C:
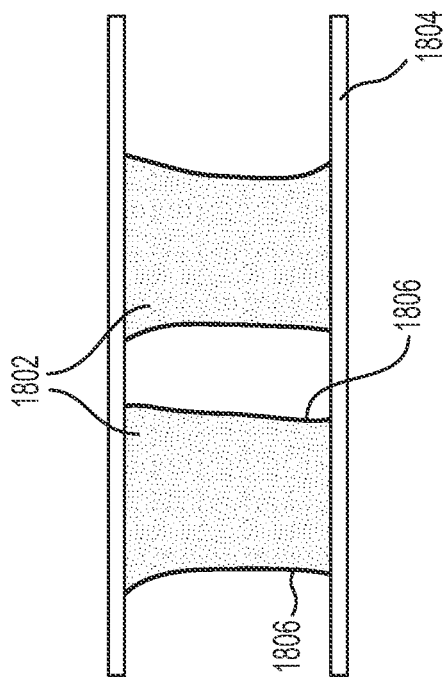

FIG. 18C illustrates an example where fluoride clusters (nanoparticles) contain both nanoparticles (having at least one of the three functions described above) and the surface coating, which may either enhance conductivity or reduce the mobility of the reaction products, or perform both functions.

Figure 18D:
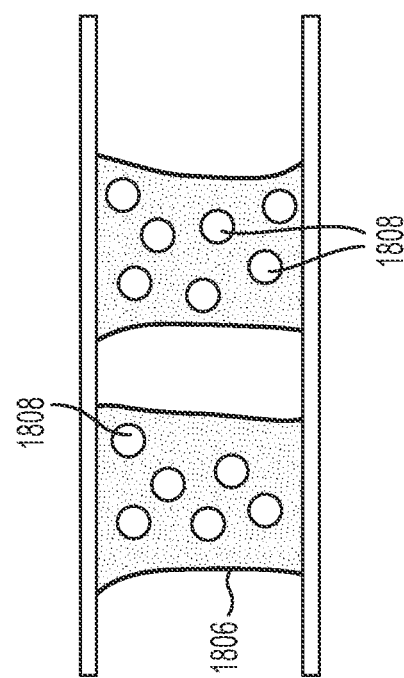

FIG. 18D illustrates an example where multiple fluoride clusters (nanoparticles) form composites with an electrically conductive material (such as carbon) and such composites are confined within these larger pores. In this case, electrons will be transferred through the conductive portion of such composites (e.g., through carbon if carbon is used for composite formation).

Figure 19:
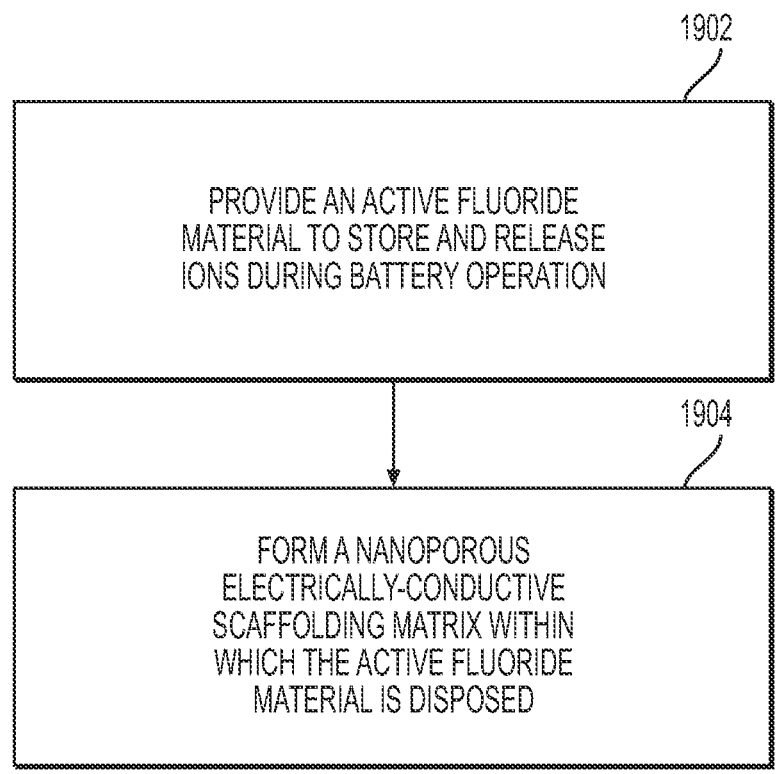
FIG. 19 includes a flow chart illustrating an example method of fabricating a metal fluoride-containing composite electrode.

FIG. 19 includes a flow chart illustrating an example method of fabricating a metal fluoride-containing composite electrode. In this example, the fabrication method includes: (i) providing an active fluoride material to store and release ions during battery operation, whereby the storing and releasing of the ions causes a substantial change in volume of the active material (block 1902); and (ii) forming a nanoporous, electrically-conductive scaffolding matrix within which the active fluoride material is disposed, wherein the scaffolding matrix structurally supports the active material, electrically interconnects the active material, and accommodates the changes in volume of the active material (block 1904). In some designs, forming the scaffolding matrix may comprise, for example, forming a carbon-containing precursor, oxidizing and carbonizing the carbon-containing precursor to form a carbonized particle, and activating the carbonized particle at elevated temperature to form the scaffolding matrix with a pore volume of greater than 50 vol. %. In some designs, the active fluoride material-infused scaffolding matrix may be formed, for example, as a powder comprising particles, with the method further comprising mixing the active fluoride material-infused scaffolding matrix particles with a binder, and casting the binder-bonded particles onto a metal foil current collector. In some designs, the method may further comprise forming a shell at least partially encasing the active fluoride material and the scaffolding matrix, the shell being substantially permeable to the ions stored and released by the active material. In some designs, at least a portion of the shell material may be deposited by chemical vapor deposition. In some designs, at least an outer portion of the shell may be deposited electrochemically during one or more initial battery cycles, during which electrochemical decomposition of at least some electrolyte components occurs.

For some designs, the protective coating(s) may be deposited from a vapor phase via vapor deposition methods. Examples of such methods include, but are not limited to, chemical vapor deposition (CVD), atomic layer deposition (ALD), plasma-enhanced ALD, plasma-enhanced CVD, vapor infiltration, and others. For some designs, the protective material may be deposited from a solution. Examples of suitable methods include sol-gel, layer-by-layer deposition, polymer adsorption, surface initiated polymerization, nanoparticles adsorption, spray drying, and others.

Figure 20A:
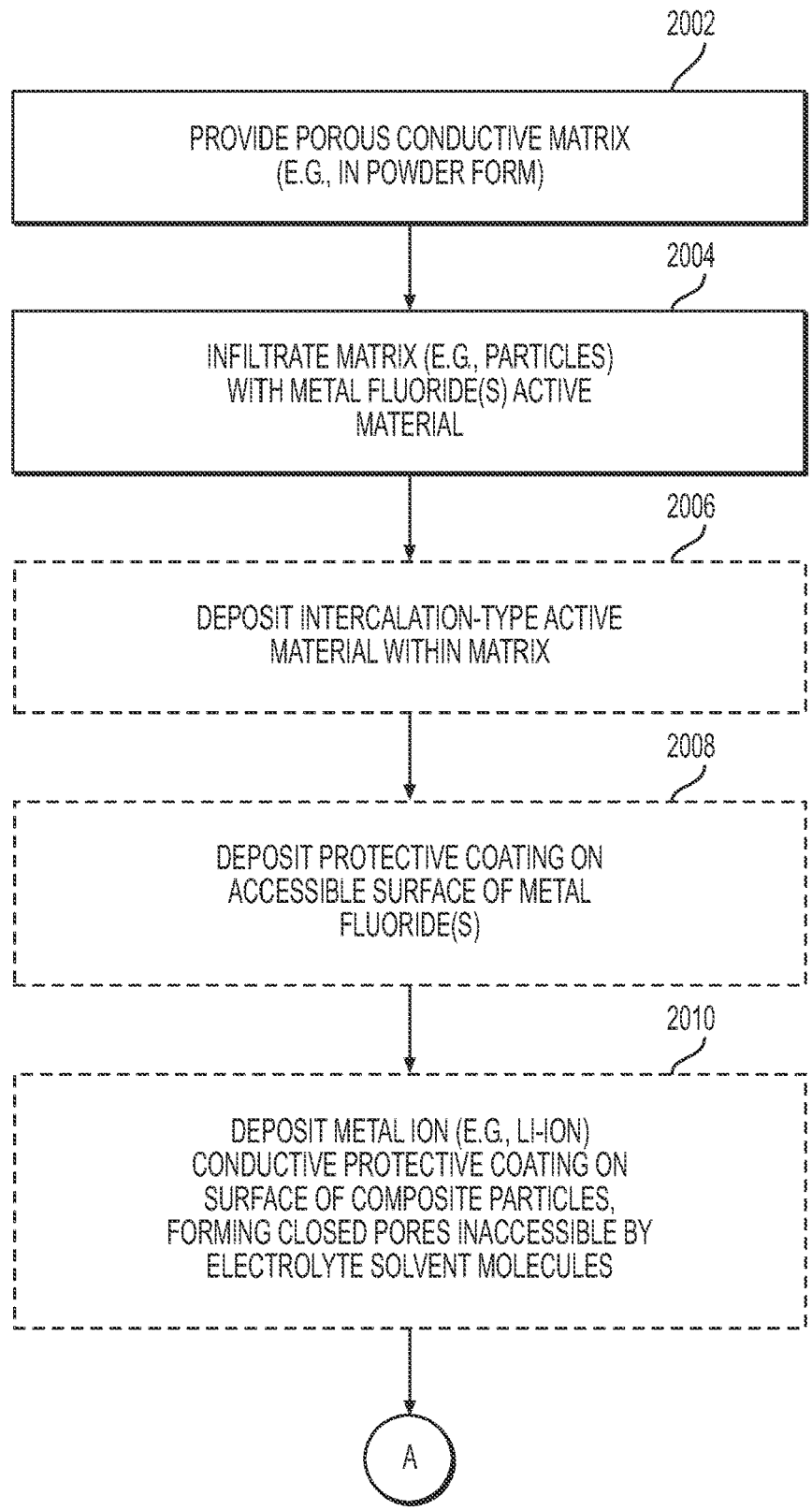
FIGS. 20A-20B include a flow chart illustrating another example method of fabricating a metal fluoride-containing composite electrode.
Figure 20B:
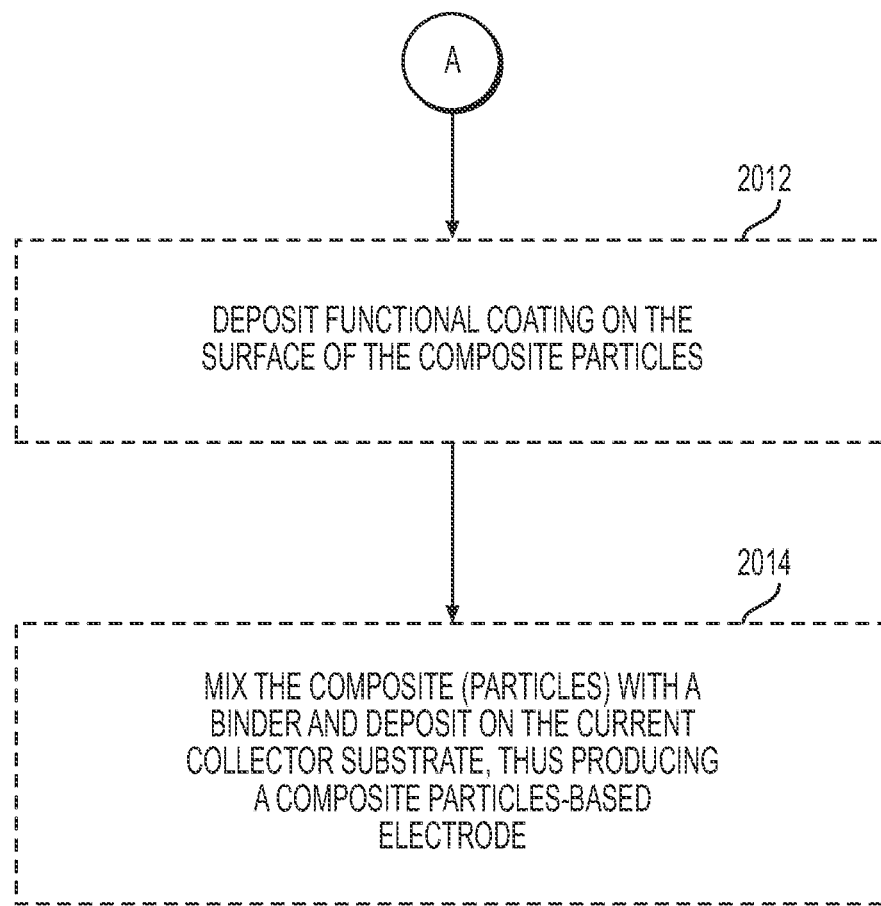

FIGS. 20A-20B include a flow chart illustrating another example method of fabricating a metal fluoride-containing composite electrode. In this example, the fabrication method includes: (i) providing a porous conductive matrix (e.g., in a powder form) (block 2002); (ii) infiltrating the matrix (e.g., particles) with metal fluoride(s) active material (block 2004); (iii) (optionally) depositing intercalation-type active material within the matrix (optional block 2006); (iv) (optionally) depositing a protective coating on the accessible surface of the metal fluoride(s) (optional block 2008); (v) (optionally) depositing a metal ion (e.g., Li-ion) conductive protective coating on the surface of the composite particles, forming closed pores inaccessible by electrolyte solvent molecules (optional block 2010); (vi) (optionally) depositing a functional coating on the surface of the composite particles (optional block 2012); and (vii) (optionally) mixing the composite (particles) with a binder and depositing on the current collector substrate, thus producing a composite particles-based electrode (optional block 2014).

The protective coating(s) may be formed not only before electrode formation but also after electrode formation (but before battery assembling). The coating may be deposited by vapor deposition methods (e.g., as described above), by solution deposition methods (e.g., as described above), by electrodeposition, by electroless deposition, and by other known methods of coating deposition.

Figure 21A:
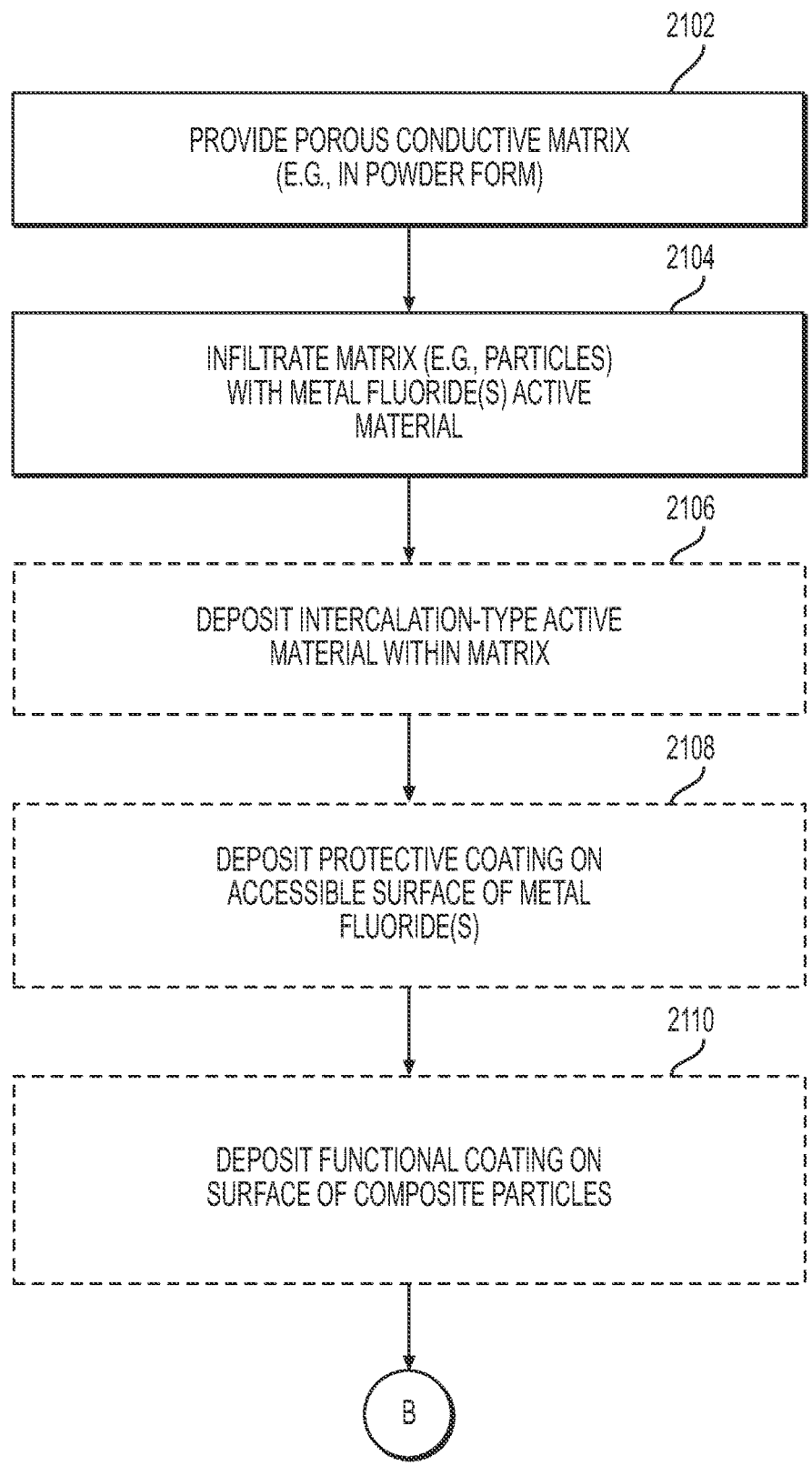
FIGS. 21A-21B include a flow chart illustrating another example method of fabricating a metal fluoride-containing composite electrode.
Figure 21B:
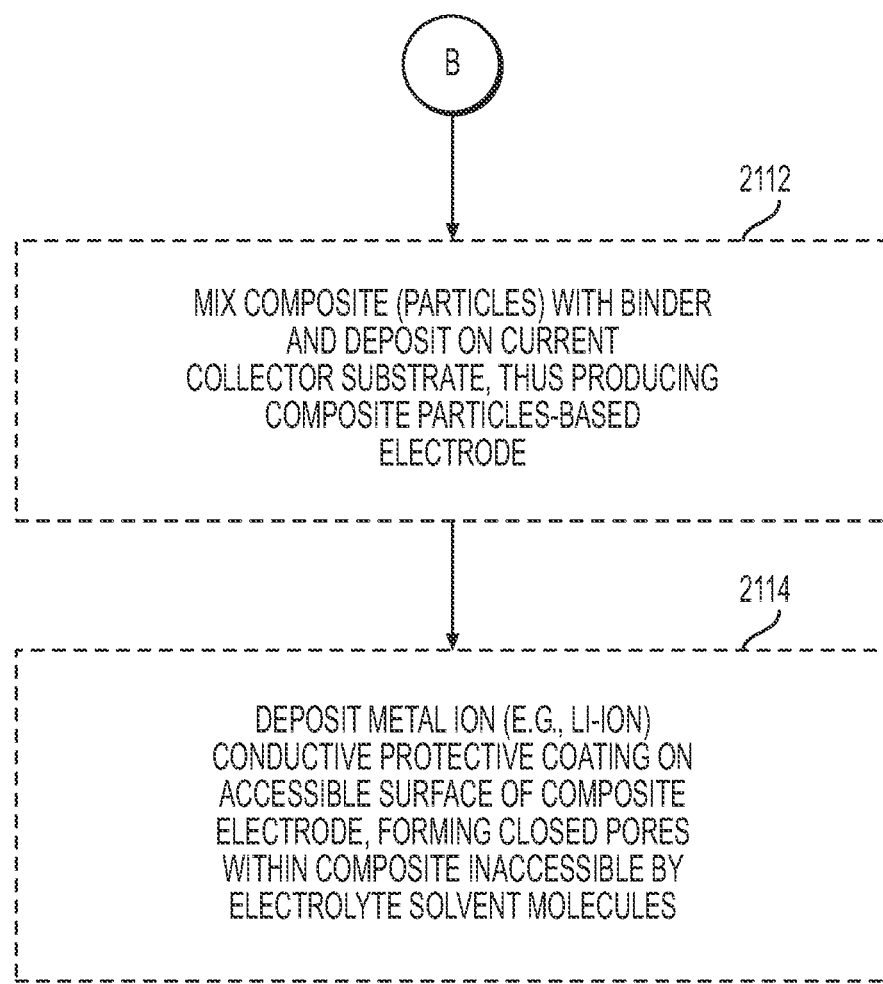

FIGS. 21A-21B include a flow chart illustrating another example method of fabricating a metal fluoride-containing composite electrode. In this example, the fabrication method includes: (i) providing a porous conductive matrix (e.g., in a powder form) (block 2102); (ii) infiltrating the matrix (e.g., particles) with metal fluoride(s) active material (block 2104); (iii) (optionally) depositing an intercalation-type active material within the matrix (optional block 2106); (iv) (optionally) depositing a protective coating on the accessible surface of the metal fluoride(s) (optional block 2108); (v) (optionally) depositing a functional coating on the surface of the composite particles (optional block 2110); (vi) (optionally) mixing the composite (particles) with a binder and depositing on the current collector substrate, thus producing a composite particles-based electrode (optional block 2112); and (vii) (optionally) depositing a metal ion (e.g., Li-ion) conductive protective coating on the accessible surface of the composite electrode, forming closed pores within the composite inaccessible by electrolyte solvent molecules (optional block 2114).

The protective coating(s) may also be formed in-situ after cell assembling. In this case, the products of the reduction (or oxidation or both) of at least one of the component(s) of the electrolyte on the surface of the electrode particles during the first cycle (at low temperature, at room temperature, or at elevated temperature (e.g., 30-80° C.)) may induce formation of a suitable protective layer permeable to active metal ions (such as Li ions in the case of Li or Li-ion batteries). In some examples, formation of suitable coatings may be catalyzed by the presence of salt additives in the electrolyte or by the surface species on the surface of the composite particles. In some examples, rare earth element-comprising salt additives (e.g., La-comprising salt additives), halogen element-comprising salt additives (e.g., I- or F-comprising additives), and sulfur-comprising salt additives may work well for the formation of protective coatings.

Figure 22A:
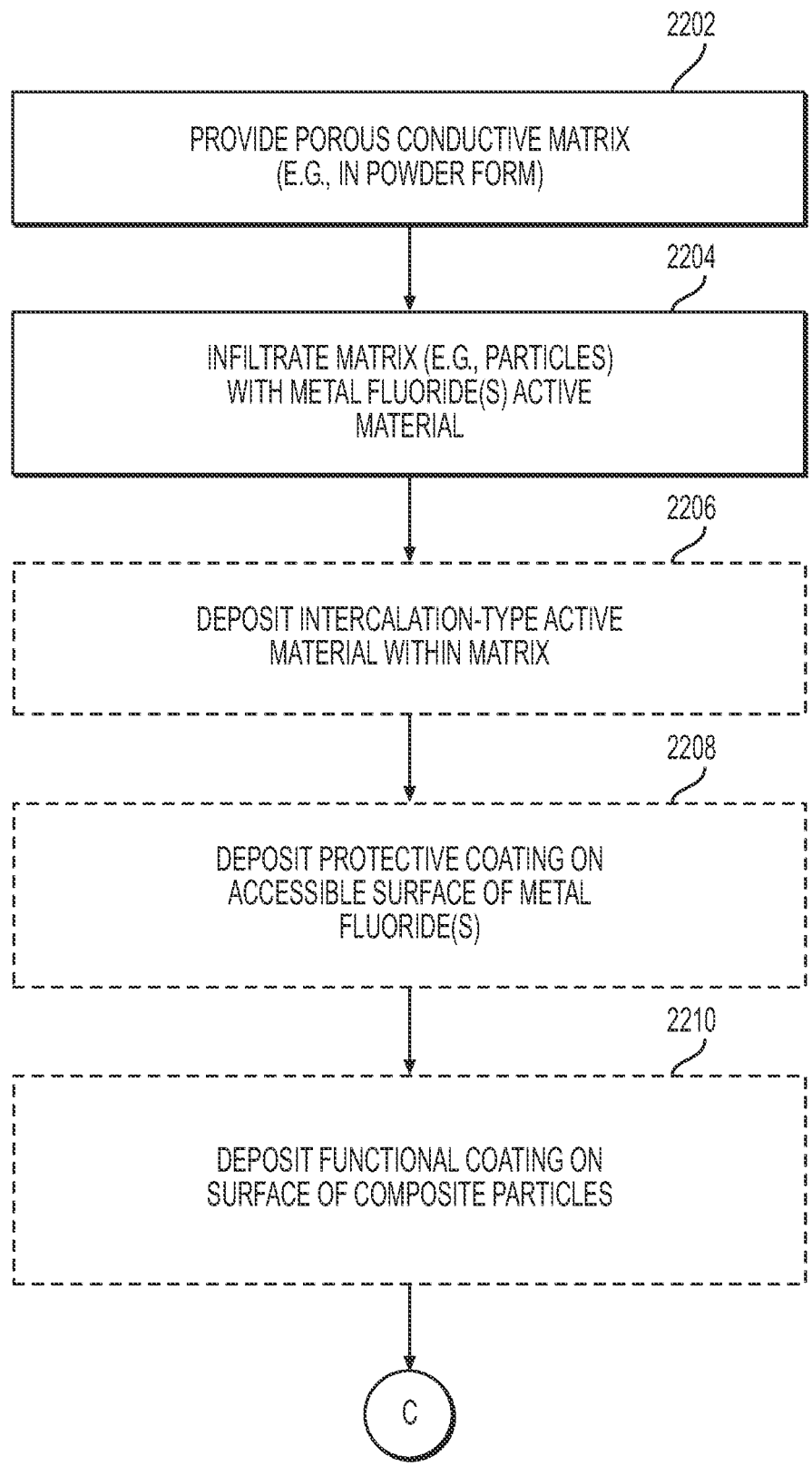
FIGS. 22A-22B include a flow chart illustrating another example method of fabricating a metal fluoride-containing composite electrode with a protective coating formed in-situ after battery assembling.
Figure 22B:
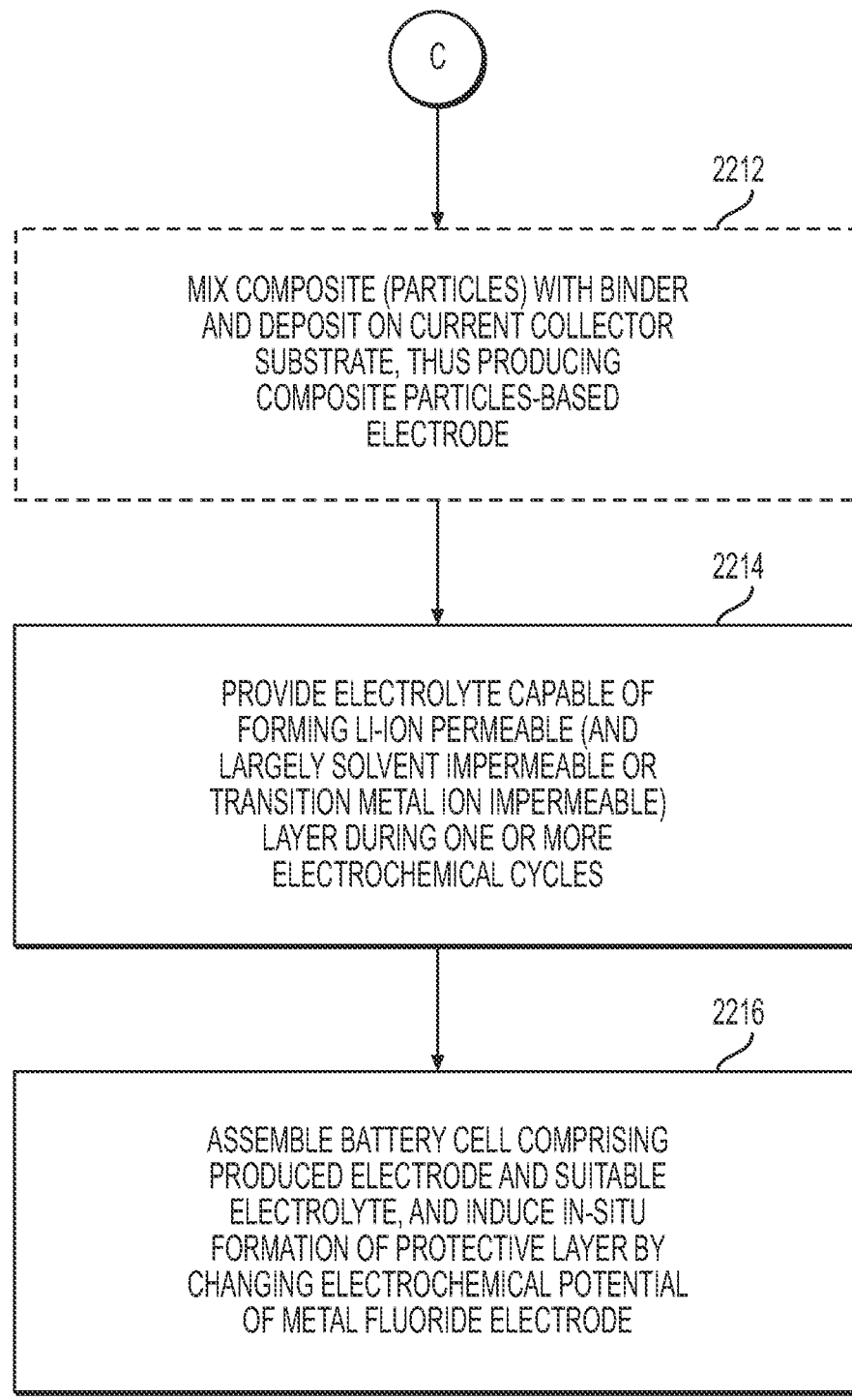

FIGS. 22A-22B include a flow chart illustrating another example method of fabricating a metal fluoride-containing composite electrode with a protective coating formed in-situ after battery assembling. In this example, the fabrication method includes: (i) providing a porous conductive matrix (e.g., in a powder form) (block 2202); (ii) infiltrating the matrix (e.g., particles) with metal fluoride(s) active material (block 2204); (iii) (optionally) depositing intercalation-type active material within the matrix (optional block 2206); (iv) (optionally) depositing a protective coating on the accessible surface of the metal fluoride(s) (optional block 2208); (v) (optionally) depositing a functional coating on the surface of the composite particles (optional block 2210); (vi) (optionally) mixing the composite (particles) with a binder and depositing on the current collector substrate, thus producing a composite particles-based electrode (optional block 2212); (vii) providing an electrolyte capable of forming a Li-ion permeable (and largely solvent impermeable or transition metal ion impermeable) layer during one or more electrochemical cycles (block 2214); and (viii) assembling a battery cell comprising the produced electrode and suitable electrolyte, and inducing in-situ formation of a protective layer by changing the electrochemical potential of the metal fluoride electrode (block 2216).

Conventional cells typically operate with 0.7-1.3M electrolytes. If organic electrolytes are used in the battery cells with MF-conductive matrix composites, the metal ion (such as Li-ion) suitable salt concentration may range from about 0.1 M to as high as about 12M. Ultra-high molarity electrolytes (e.g., 3-12M, if such high concentrations can be achieved in electrolytes without salt precipitation), in particular, may significantly improve stability of these composites (particularly if protective coatings are not present or are imperfect) by significantly reducing dissolution of the metal fluorides during cycling. It may be particularly advantageous to utilize an electrolyte with solvation energy of the Li-ion salts higher than that of the metal ions or metal-comprising ions (which may be produced during the conversion reactions within metal fluorides).

In some designs, one or more of the fluoride-containing compositions described above may contain Li.

In some designs, it may be advantageous to pre-lithiate metal fluoride electrodes prior to using them in rechargeable Li or Li-ion battery cells. Several methods have been found suitable. These include but are not limited to: (i) direct contact with a Li metal or Li metal alloy composition, (ii) chemical lithiation, and (iii) electrochemical lithiation. For electrochemical lithiation, Li is inserted into the fluoride-comprising electrode from an electrolyte under an application of an electrical current. Insertion of Li ions is accompanied either by replenishing Li cations into electrolyte from another Li-containing electrode (e.g., a Li foil) or by formation of reduced species (e.g., in a gaseous, a liquid, or a solid form) at the counter electrode (from the counter anions).

The process of electrochemical lithiation may also take place within a pre-assembled or a fully assembled cell. In this case, a third electrode (in addition to anodes and cathodes) may be used as a Li source. This third electrode may preferably have a high Li content. In one example, a Li foil (e.g., surface protected Li foil) may serve as this sacrificial electrode for supplying Li ions for lithiation. In some applications, such a third electrode may be (nearly) completely consumed.

The description is provided to enable any person skilled in the art to make or use embodiments of the present invention. It will be appreciated, however, that the present invention is not limited to the particular formulations, process steps, and materials disclosed herein, as various modifications to these embodiments will be readily apparent to those skilled in the art. That is, the generic principles defined herein may be applied to other embodiments without departing from the spirit or scope of the invention.

The invention claimed is:

1. A battery electrode composition, comprising:
a composite particle comprising:
an active fluoride-comprising material provided to store and release ions during battery operation; and
an electrically-conductive scaffolding matrix within which the active fluoride-comprising material is disposed, wherein the scaffolding matrix is comprised of over about 90% $sp^2$-bonded carbon atoms.

2. The battery electrode composition of claim 1, wherein the scaffolding matrix exhibits a Young's modulus of over about 5 MPa.

3. The battery electrode composition of claim 1, wherein the scaffolding matrix comprises pores with a pore volume fraction in a range of about 70 vol. % to about 95 vol. % relative to a total volume of the scaffolding matrix.

4. The battery electrode composition of claim 3, wherein over about 50 vol. % of the pores exhibit pore sizes in a range of about 0.5 nm to about 10 nm.

5. The battery electrode composition of claim 4, wherein about 80 vol. % or more of the pores exhibit pore sizes in the range of 0.5 nm to 10 nm.

6. The battery electrode composition of claim 1, wherein the composite particle is coated with a protective layer comprising an electrolyte solvent-impermeable shell material conductive to Li-ions.

7. The battery electrode composition of claim 6, wherein the protective layer comprises a metal oxide.

8. The battery electrode composition of claim 7, wherein the metal oxide exhibits a layered microstructure.

9. The battery electrode composition of claim 6, wherein the protective layer comprises a metal oxyfluoride.

10. The battery electrode composition of claim 6, wherein the protective layer comprises carbon (C).

11. The battery electrode composition of claim 6, wherein the protective layer comprises tungsten (W).

12. The battery electrode composition of claim 1, wherein the active fluoride-comprising material comprises iron (Fe).

13. The battery electrode composition of claim 1, wherein the active fluoride-comprising material comprises two or more transition metals.

14. A method of synthesizing the battery electrode composition of claim 1, comprising:
performing one or more processes to produce the composite particle.

15. The method of claim 14, wherein the one or more processes comprise pyrolyzing a carbon-comprising organic precursor to produce a pyrolyzed carbon-comprising material.

16. The method of claim 15, wherein the one or more processes further comprise chemical activation of the pyrolyzed carbon-comprising material.

17. The method of claim 15, wherein the one or more processes further comprise physical activation of the pyrolyzed carbon-comprising material.

18. The method of claim 14, wherein the one or more processes comprise producing the active fluoride-comprising material via a reaction between a metal or a metal oxide with fluorine or a fluorinating agent.

19. The method of claim 18, wherein the reaction proceeds in a gaseous phase.

20. The method of claim 18, wherein the reaction proceeds in a liquid phase.

21. The method of claim 14, wherein the one or more processes comprise producing the active fluoride-comprising material via an ion exchange reaction between an active fluoride-forming element and a soluble fluoride.

\* \* \* \* \*